United States Patent
Kim et al.

(10) Patent No.: US 9,811,240 B2
(45) Date of Patent: Nov. 7, 2017

(54) OPERATING METHOD OF IMAGE DISPLAY APPARATUS

(71) Applicant: LG ELECTRONICS INC., Seoul (KR)

(72) Inventors: Uniyoung Kim, Seoul (KR); Junghoon Son, Seoul (KR); Choonkeun Youn, Seoul (KR); Ryunghwa Rhee, Seoul (KR); Taejun Kim, Seoul (KR); Kunsik Lee, Seoul (KR); Byunghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 223 days.

(21) Appl. No.: 14/290,377

(22) Filed: May 29, 2014

(65) Prior Publication Data

US 2014/0359522 A1 Dec. 4, 2014

(30) Foreign Application Priority Data

Jun. 3, 2013 (KR) ........................ 10-2013-0063606

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0488* (2013.01); *G06F 3/04812* (2013.01); *G06F 3/04817* (2013.01); *G06F 3/04845* (2013.01); *H04N 5/4403* (2013.01); *H04N 21/42222* (2013.01); *H04N 21/4312* (2013.01); *H04N 21/4728* (2013.01); *H04N 21/4781* (2013.01); *H04N 21/482* (2013.01);
(Continued)

(58) Field of Classification Search
CPC ... G06F 3/0482; G06F 3/04817; G06F 3/0488
USPC ......................................... 715/781
See application file for complete search history.

(56) References Cited

U.S. PATENT DOCUMENTS 5,900,869 A * 5/1999 Higashio ................. G06F 3/038
715/751
6,753,892 B2 * 6/2004 Chung .................. G06F 3/0482
715/810

(Continued)

FOREIGN PATENT DOCUMENTS

| CN | 101859190 A | 10/2010 |
| CN | 102487460 A | 6/2011 |
| EP | 2299699 A2 | 3/2011 |

*Primary Examiner* — David Phantana Angkool
(74) *Attorney, Agent, or Firm* — Birch, Stewart, Kolasch & Birch, LLP

(57) ABSTRACT

Disclosed is an operating method of an image display apparatus. The operating method includes displaying a first image on a display, displaying a first pointer on the display, the first pointer being linked to a first remote control device, displaying a second pointer on the display, the second pointer being linked to a second remote control device, the second pointer having a different shape than the first pointer, receiving a first user screen view command from the first remote control device, displaying a second image, the second image being a demagnified version of the first image, and displaying a first user screen on an area of the display where the second image is not displayed.

14 Claims, 23 Drawing Sheets

(51) Int. Cl.
  *G06F 3/0481* (2013.01)
  *G06F 3/0484* (2013.01)
  *G06F 3/0488* (2013.01)
  *H04N 21/422* (2011.01)
  *H04N 21/4728* (2011.01)
  *H04N 21/478* (2011.01)
  *H04N 21/482* (2011.01)
  *H04N 5/44* (2011.01)
  *H04N 21/431* (2011.01)
  *H04N 21/4788* (2011.01)
  *H04N 21/485* (2011.01)
  *H04N 21/488* (2011.01)

(52) U.S. Cl.
  CPC ....... *H04N 21/4788* (2013.01); *H04N 21/485* (2013.01); *H04N 21/4882* (2013.01); *H04N 2005/4412* (2013.01); *H04N 2005/4428* (2013.01)

(56) References Cited

U.S. PATENT DOCUMENTS

| | | | | |
|---|---|---|---|---|
| 7,661,075 B2* | 2/2010 | Lahdesmaki | ......... | G06F 3/0482 715/821 |
| 8,068,094 B2* | 11/2011 | Sakurai | ................ | G06F 3/0482 345/156 |
| 8,108,777 B2* | 1/2012 | Penner | .................... | G06F 17/24 715/730 |
| 9,110,521 B2* | 8/2015 | Suzuki | .................. | G06F 3/0346 |
| 9,477,368 B1* | 10/2016 | Filip | .................. | G06F 17/30241 |
| 9,594,489 B2* | 3/2017 | Niranjani | ............. | G06F 3/04845 |
| 9,612,729 B2* | 4/2017 | Yoo | ..................... | G06F 3/04842 |
| 2006/0022955 A1* | 2/2006 | Kennedy | ............... | G06F 3/0414 345/173 |
| 2010/0118195 A1 | 5/2010 | Eom et al. | | |
| 2010/0122207 A1* | 5/2010 | Kim | ...................... | G06F 3/0481 715/788 |
| 2010/0193810 A1 | 8/2010 | Tsai et al. | | |
| 2011/0061020 A1* | 3/2011 | Yoo | ..................... | H04N 5/44591 715/790 |
| 2011/0193810 A1 | 8/2011 | Park et al. | | |
| 2011/0197263 A1* | 8/2011 | Stinson, III | ............. | G06F 3/011 726/4 |
| 2012/0139945 A1 | 6/2012 | Choi | | |
| 2012/0262370 A1* | 10/2012 | Ko | ...................... | G06F 3/03547 345/157 |
| 2012/0262420 A1* | 10/2012 | Sobel | ..................... | G06F 3/0425 345/175 |
| 2013/0050131 A1* | 2/2013 | Lee | ..................... | G08G 1/09626 345/174 |
| 2014/0075330 A1* | 3/2014 | Kwon | ..................... | G06F 3/038 715/750 |
| 2014/0344753 A1* | 11/2014 | Akasaka | ............... | G06F 3/0488 715/823 |
| 2015/0181278 A1* | 6/2015 | Yoon | ................ | H04N 21/42218 725/37 |

* cited by examiner (a)            (b)            (c)

OPERATING METHOD OF IMAGE DISPLAY APPARATUS

CROSS-REFERENCE TO RELATED APPLICATION

This application claims the priority benefit of Korean Patent Application No. 10-2013-0063606, filed on Jun. 3, 2013, in the Korean Intellectual Property Office, the disclosure of which is incorporated herein by reference in its entirety.

BACKGROUND OF THE INVENTION

1. Field of the Invention

The present invention relates to an image display apparatus and an operating method thereof and, more particularly, to an image display apparatus, which is capable of providing a wider variety of functions and enhanced convenience by displaying pointers and related objects controlled by a remote control device in a visually differentiated manner, and an operating method thereof.

2. Description of the Related Art

An image display apparatus is an apparatus having a function to display an image viewable by a user. The user can watch a broadcast via the image display apparatus. The image display apparatus displays a broadcast selected by the user from among broadcasts transmitted from a broadcast station. Currently, broadcasting is transitioning from analog to digital all over the world.

Digital broadcasting refers to broadcast of digital video and audio signals. As compared to analog broadcasting, digital broadcasting has many advantages, such as robustness against noise, less data loss, ease of error correction and the ability to provide clear, high-definition images. In addition, provision of interactive service (bidirectional service) is possible under digital broadcasting unlike in analog broadcasting.

Meanwhile, a remote control device and the like serve as an input device to operate the image display apparatus. Through diversification of operations executed in the image display apparatus, there is demand for various functions with regard to the remote control device and, therefore, various solutions to increase user convenience have been studied.

SUMMARY OF THE INVENTION

It is an object of the present invention to provide an image display apparatus, which is capable of providing a wider variety of functions and enhanced convenience by displaying pointers and related objects controlled by a remote control device in a visually differentiated manner, and an operating method thereof.

In accordance with one aspect of the present invention, the above and other objects can be accomplished by the provision of an operating method of an image display apparatus, the method including displaying a first image on a display, displaying a first pointer on the display, the first pointer being linked to a first remote control device, displaying a second pointer on the display, the second pointer being linked to a second remote control device, the second pointer having a different shape than the first pointer, receiving a first user screen view command from the first remote control device, displaying a second image, the second image being a demagnified version of the first image, and displaying a first user screen on an area of the display where the second image is not displayed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the present invention, examples of which are illustrated in the accompanying drawings.

With respect to constituent elements used in the following description, suffixes "module" and "unit" are given or mingled with each other only in consideration of ease in the preparation of the specification, and do not have or serve as different meanings.

Figure 1:
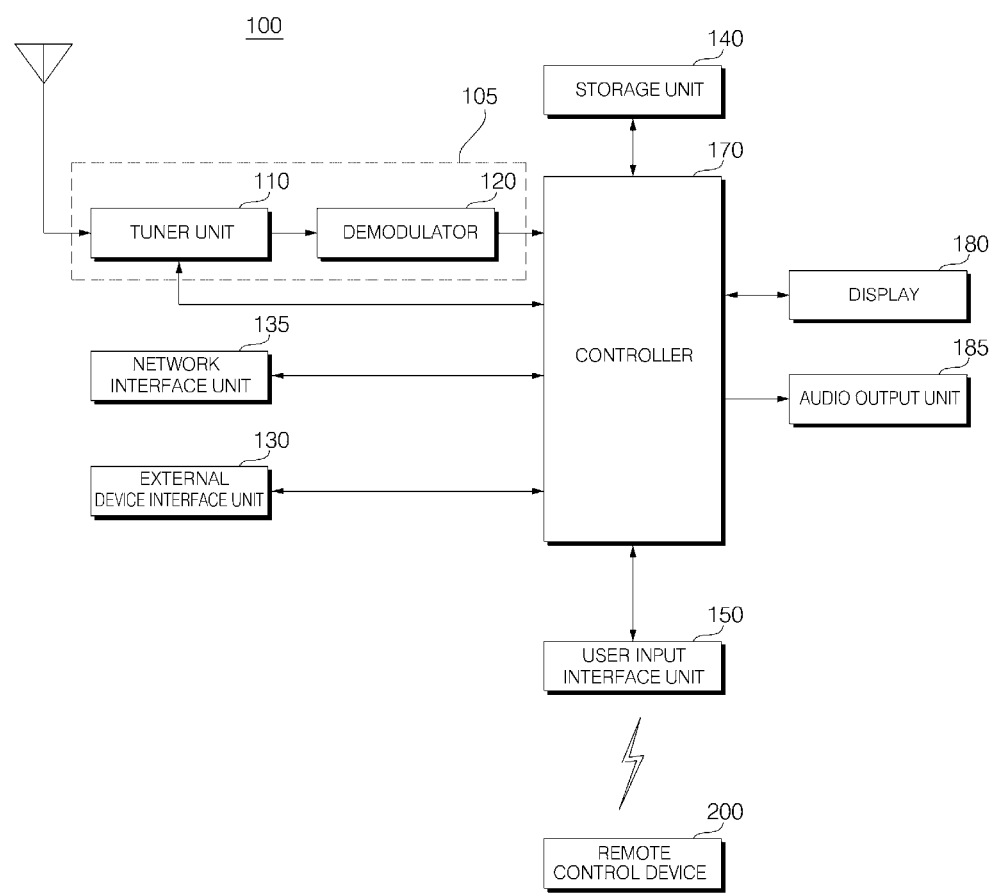
FIG. 1 is an internal block diagram of an image display apparatus according to one embodiment of the present invention.

FIG. 1 is an internal block diagram of an image display apparatus according to one embodiment of the present invention.

Referring to FIG. 1, the image display apparatus 100 according to one embodiment of the present invention may include a broadcast receiving unit 105, an external device interface unit 130, a storage unit 140, a user input interface unit 150, a sensor unit (not shown), a controller 170, a display 180 and an audio output unit 185.

The broadcast receiving unit 105 may include a tuner unit 110, a demodulator 120 and a network interface unit 135. Of course, as needed, the broadcast receiving unit 105 may be designed to include the tuner unit 110 and the demodulator 120 without the network interface unit 135 and, conversely, may be designed to include the network interface unit 135 without the tuner unit 110 and the demodulator 120.

The tuner unit 110 tunes a Radio Frequency (RF) broadcast signal, corresponding to a channel selected by a user or any one of previously stored channels, from among RF broadcast signals received through an antenna. Then, the tuner unit 110 converts the tuned RF broadcast signal into an Intermediate Frequency (IF) signal or a baseband audio or video signal.

For example, when the tuned RF broadcast signal is a digital broadcast signal, the tuner unit 110 converts the RF broadcast signal into a digital IF (DIF) signal. When the tuned RF broadcast signal is an analog broadcast signal, the tuner unit 110 converts the RF broadcast signal into an analog baseband video or audio signal (Composite Video Banking Sync/Sound Intercarrier Frequency (CVBS/SIF) signal). That is, the tuner unit 110 may be a hybrid tuner capable of processing not only a digital broadcast signal but also an analog broadcast signal. The analog baseband video or audio signal (CUBS/SIF signal) output from the tuner unit 110 may be directly input to the controller 170.

In addition, the tuner unit 110 may receive an RF broadcast signal from an Advanced Television System Committee (ATSC) single carrier system or from a Digital Video Broadcasting (DVB) multi-carrier system.

In the present invention, the tuner unit 110 may sequentially tune RF broadcast signals, corresponding to all broadcast channels previously stored via a channel storage function, from among the RF broadcast signals received through the antenna, and may convert the RF broadcast signals into IF signals or baseband video or audio signals.

Meanwhile, to receive broadcast signals corresponding to a plurality of channels, the tuner unit 110 may include a plurality of tuners. Alternatively, a single tuner capable of simultaneously receiving broadcast signals of plural channels is possible.

The demodulator 120 receives the DIF signal converted in the tuner unit 110 and demodulates the same.

The demodulator 120 may output a stream signal (Transport Stream (TS) signal) after implementing demodulation and channel decoding. In this case, the stream signal may be obtained by multiplexing a video signal, an audio or a data signal.

The stream signal output from the demodulator 120 may be input to the controller 170. The controller 170 may implement demultiplexing, audio/video (A/V) signal processing and the like and, thereafter, may output a processed video signal to the display 180 and output a processed audio signal to the audio output unit 185.

The external device interface unit 130 may implement data transmission or reception with a connected external device (not shown). To this end, the external device interface unit 130 may include an A/V input/output unit (not shown) or a wireless communication unit (not shown).

The external device interface unit 130 may be connected to an external device, such as a Digital Versatile Disk (DVD), a Blu-ray disc, a gaming device, a camera, a camcorder, a computer (e.g., a laptop computer), a set-top box or the like, in a wired or wireless manner, and may implement input/output operation with the external device.

The A/V input/output unit may receive video and audio signals from the external device. The wireless communication unit may implement a local area wireless communication with other electronic devices.

The network interface unit 135 provides an interface for connecting the image display apparatus 100 to a wired or wireless network including an Internet network. For example, the network interface unit 135 may receive content or data provided by an Internet or content provider or a network manager via a network.

The network interface unit 135 may implement data communication with an adjacent electronic device around the image display apparatus 100. In this case, the network interface unit 135 may receive device information of another electronic device, remote controllable channel information, frequency information or code information of another electronic device or the like.

The storage unit 140 may store programs for signal processing and control of the controller 170 and may also store processed video, audio or data signals.

The storage unit 140 may function to temporarily store video, audio or data signals input to the external device interface unit 130. The storage unit 140 may further store information regarding broadcast channels through a channel storage function, such as a channel map function, etc.

In addition, the storage unit 140 may store infrared (IR) signals, i.e. IR format key codes for control of other electronic devices and may store IR format key database of a plurality of electronic devices.

Although FIG. 1 shows the embodiment in which the storage unit 140 and the controller 170 are provided separately, the scope of the present invention is not limited thereto. The storage unit 140 may be included in the controller 170.

The user input interface unit 150 may transmit a signal input by the user to the controller 170, or may transmit a signal from the controller 170 to the user.

For example, the user input interface unit 150 may receive or transmit a user input signal, such as power on/off, channel selection, screen setup, etc., may transmit a user input signal received from a local key (not shown), such as a power key, a channel key, a volume key, a setup key, etc., to the controller 170, may transmit a user input signal received from a sensor unit (not shown) that senses a user gesture to the controller 170, or may transmit a signal from the controller 170 to the sensor unit (not shown).

According to an embodiment of the present invention, the user input interface unit 150 may receive personal information from the remote control device 200. In addition to the personal information, the user input interface unit 150 may further receive information regarding a web server that is being accessed through the personal information.

For example, when a mobile terminal and the remote control device 200 have approached each other within a predetermined distance to implement Near Field Communication (NFC), the remote control device 200 may receive personal information stored in the mobile terminal. In addition, the remote control device 200 may transmit the personal information to the image display apparatus 100 using an IR or RF scheme. In this case, the user input interface unit 150 transmits the received personal information to the controller 170.

Meanwhile, the aforementioned personal information may include personal ID information, password information, personal e-mail information or the like with regard to the mobile terminal. Alternatively, the personal information may include personal ID information, password information, personal e-mail information or the like with regard to the image display apparatus 100. Alternatively, the personal information may be personal ID information, password information or the like that may be commonly used in various electronic devices including the mobile terminal. Alternatively, the personal information may be personal ID information, password information or the like with regard to a web server that is previously stored in the mobile terminal.

Alternatively, the personal information may be personal ID information, password information or the like with regard to a web server that may be used not only in the mobile terminal but also in the image display apparatus 100. Alternatively, the personal information may be personal ID information, password information or the like with regard to a server that has accessed the image display apparatus 100.

That is, the personal information may be information required to log in to an electronic device or service using a user account.

The user input interface unit 150 may receive device information of an adjacent electronic device around the image display apparatus 100, remote controllable channel information, frequency information or code information of another electronic device or the like, transmitted from the remote control device 200.

The controller 170 may demultiplex a stream signal input through the tuner unit 110, the demodulator 120 or the external device interface unit 130, or may process demultiplexed signals to generate and output signals for image or audio output.

An image signal processed by the controller 170 may be input to the display 180 and an image corresponding to the image signal may then be displayed on the display 180. In addition, the image signal processed by the controller 170 may be input to an external output device through the external device interface unit 130.

An audio signal processed by the controller 170 may be output to the audio output unit 185 for audio output. In addition, the audio signal processed by the controller 170 may be input to an external output device through the external device interface unit 130.

Although not shown in FIG. 1, the controller 170 may include a demultiplexer, an image processor and the like. This will be described below with reference to FIG. 2.

The controller 170 may control overall operations of the image display apparatus 100. For example, the controller 170 may control the tuner unit 110 so as to tune an RF broadcast corresponding to a channel selected by the user or a pre-stored channel.

The controller 170 may control the image display apparatus 100 in response to a user command input through the user input interface unit 150 or using an internal program.

The controller 170 may control the display 180 to display an image. In this case, the image displayed on the display 180 may be a still image or a moving image and may be a 2-Dimensional (2D) image or a 3-Dimensional (3D) image.

The controller 170 may generate a 3D object corresponding to an object included in an image displayed on the display 180 and display the 3D object on the display 180. For example, the object may be at least one of an accessed webpage (associated with newspaper, magazine or the like), an Electronic Program Guide (EPG), various menus, a widget, an icon, a still image, a moving image and text.

In addition, the controller 170 may recognize a position of the user based on an image captured by an image capture unit (not shown). For example, the controller 170 may recognize a distance (in the Z-axis) between the user and the image display apparatus 100. In addition, the controller 170 may recognize X-axis and Y-axis coordinates corresponding to the position of the user on the display 180.

According to an embodiment of the present invention, the controller 170 may control implementation of login based on the personal information received from the remote control device 200. In this case, login may be login to the image display apparatus 100, login to a server that has accessed the image display apparatus 100 or login to a web server subscribed through the personal information.

For example, upon logging in to the image display apparatus 100 using personal ID information and password information received from the remote control device 200, the controller 170 may control display of a personal screen, preset on a per user account basis, on the display 180. When the user currently views an image, the controller 170 may control simultaneous display of the image that the user currently views and the preset personal screen. Alternatively, the controller 170 may control scene change of the image that the user currently views to display the preset personal screen changed from the image.

In another example, upon logging in to a server that has accessed the image display apparatus 100, the controller 170 may control display of a server access screen received from the corresponding server on the display 180. Specifically, the server access screen may be an application server screen. When the user currently views an image, the controller 170 may control simultaneous display of the image that the user currently views and the server access screen. Alternatively, the controller 170 may control scene change of the image that the user currently views to display the server access screen changed from the image.

In a further example, when the received personal information is personal information related to other electronic devices, more particularly, web servers that have been accessed by the mobile terminal, the controller 170 may control the image display apparatus 100 to access the corresponding web servers and control display of a screen related to the accessed web servers on the display 180. In this case, the web servers may be web servers that provide a social network service. When the user currently views an image, the controller 170 may control simultaneous display of the image that the user currently views and the screen related to the accessed web servers. Alternatively, the controller 170 may control scene change of the image that the user currently views to display the screen related to the accessed web servers changed from the image.

When the image display apparatus 100, which has received the personal information, is powered off, the controller 170 may control a power supply unit (not shown) to turn on the image display apparatus 100. That is, upon receiving the personal information from the user input interface unit 150 in a standby mode, the controller 170 switches from the standby mode to a wakeup mode to control the power supply unit so as to supply power to various modules or units.

Based on device information of an adjacent electronic device around the image display apparatus 100, remote controllable channel information, frequency information or code information of another electronic device or the like, which is received from the network interface unit 135 or the user input interface unit 150, and according to personal information received from the remote control device 200, the controller 170 may judge whether or not each electronic device is accessed. Then, the controller 170 may control display of an object showing login of another electronic device on the display 180.

Alternatively, based on device information of an adjacent electronic device around the image display apparatus 100, remote controllable channel information, frequency information or code information of another electronic device or the like, the controller 170 may control transmission of corresponding device information, channel information, frequency information or code information to the remote control device 200.

Although not shown in the drawing, the image display apparatus 100 may further include a channel browsing processor which generates a thumbnail image corresponding to a channel signal or an external input signal. The channel browsing processor may receive a stream signal (TS) output from the demodulator 120 or a stream signal output from the external device interface unit 130 and extract an image from the received stream signal to generate a thumbnail image. The generated thumbnail image may be stream decoded together with a decoded image or the like and the decoded thumbnail image may then be input to the controller 170. Through use of the input thumbnail image, the controller 170 may display a thumbnail list including a plurality of thumbnail images on the display 180.

The thumbnail list may be displayed in a simple view scheme such that the thumbnail list is displayed on a partial area on the display 180 while an image is being displayed on the display 180, or may be displayed in a full view scheme such that the thumbnail, list is displayed on a most area of the display 180. Thumbnail images of the thumbnail list may be sequentially updated.

The display 180 converts an image signal, a data signal, an OSD signal or a control signal processed by the controller 170 or an image signal, a data signal or a control signal received from the external device interface unit 130 to generate a drive signal.

The display 180 may be a Plasma Display Panel (PDP), a Liquid Crystal Display (LCD), an Organic Light Emitting Diode (OLED), a flexible display or the like and may also be a 3D display.

Meanwhile, the display 180 may also be constructed of a touchscreen to be used not only as an output device but also as an input device.

The audio output unit 185 receives an audio-processed signal from the controller 170 and audibly outputs the audio-processed signal.

The image capture unit (not shown) captures an image of the user. Although the image capture unit (not shown) may take the form of a single camera, the present invention is not limited thereto and the image capture unit (not shown) may include a plurality of cameras. Meanwhile, the image capture unit (not shown) may be embedded in the image display device 100 above the display 180 and may also be separately arranged. Information regarding an image captured by the image capture unit (not shown) may be input to the controller 170.

The controller 170 may detect a user gesture based on an image captured by the image capture unit (not shown), a sensed signal from the sensor unit (not shown) or a combination of the captured image and the sensed signal.

The remote control device 200 transmits a user input signal to the user input interface unit 150. To this end, the remote control device 200 may use Bluetooth, Radio Frequency (RF) communication, Infrared (IR) communication, Ultra Wideband (UWB), ZigBee, NFC or the like.

In addition, the remote control device 200 may receive a video, audio or data signal output from the user input interface unit 150. In addition, the remote control device 200 may display an image or output sound based on the received video, audio or data signal.

Meanwhile, the remote control device 200 according to an embodiment of the present invention may receive information from an electronic device through near field communication or the like. As described above, the information may be personal ID information and password information that may be used in the mobile terminal, an image display apparatus, an electronic device or the like.

The remote control device 200 may transmit the received personal information to the image display apparatus 100. Here, the remote control device 200 may use an IR or RF scheme as a communication scheme.

In the following description of the embodiment of the present invention, the remote control device 200 may be a spatial remote controller that can display a pointer corresponding to motion of the user. That is, the remote control device 200 may transmit personal information or the like to the image display apparatus 100 using an RB scheme.

In addition to the personal information, the remote control device 200 may further receive information regarding a web server that has been accessed through the personal information. For example, the remote control device 200 may receive web server information related to a social network service that has been accessed by the mobile terminal. The remote control device 200 transmits the web server information to the image display apparatus 100.

The remote control device 200 may also receive device information of another electronic device, remote controllable channel information, frequency information or code information of another electronic device or the like from an adjacent electronic device around the image display apparatus 100. The remote control device 200 may implement remote control by allotting a channel, frequency or code to an electronic device based on information regarding the corresponding electronic device.

Meanwhile, the image display apparatus 100 as described above may be a stationary or mobile digital broadcast receiver that can receive a digital broadcast.

The block diagram of FIG. 1 shows the image display apparatus 100 according to one embodiment of the present invention. The respective blocks of the block diagram may be integrated, added or omitted according to the specifications of the image display apparatus 100 which is actually implemented. For example, two or more components may be combined into a single component or a single component may be divided into two more components as needed. In addition, functions of the components of the image display apparatus 100 are set forth herein only to explain the embodiments of the present invention and the specific operations and configurations of the components should not be construed as limiting the scope of the present invention.

Unlike that shown in FIG. 1, the image display apparatus 100 may not include the tuner unit 110 and the demodulator 120 shown in FIG. 1 and may receive video content through the network interface unit 135 or the external device interface unit 130 and reproduce the same.

Figure 2:
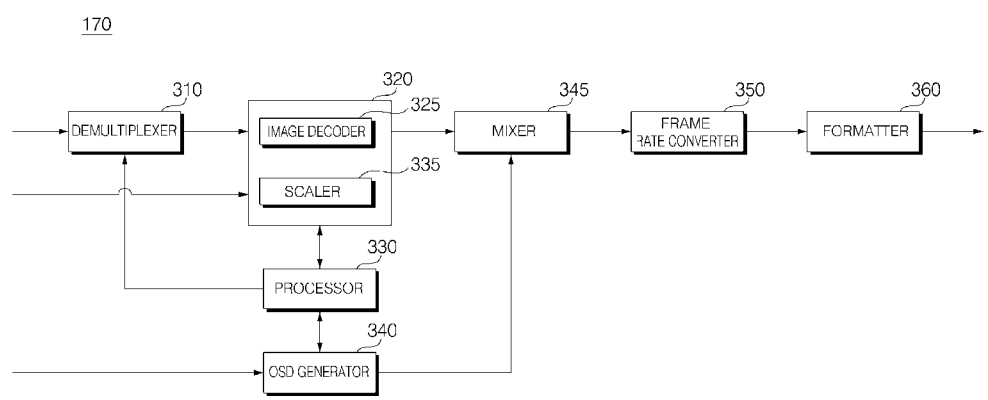
FIG. 2 is an internal block diagram of a controller shown in FIG. 1.

FIG. 2 is an internal block diagram of the controller shown in FIG. 1.

Referring so the drawing, the controller 170 according to one embodiment of the present invention may include, a demultiplexer 310, an image processing unit 320, a processor 330, an OSD generator 340, a mixer 345, a Frame Rate Converter (FRG) 350 and a formatter 360. The controller 170 may further include an audio processor (not shown) and a data processor (not shown).

The demultiplexer 310 demultiplexes an input stream. For example, when an MPEG-2 TS is input to the demultiplexer 310, the demultiplexer 310 demultiplexes the MPEG-2 TS into image, audio and data signals. Here, the stream signal input to the demultiplexer 310 may be a stream signal output from the tuner unit 110, the demodulator 120 or the external device interface unit 130.

The image processing unit 320 may implement image processing on the demultiplexed image signal. To this end, the image processing unit 320 may include an image decoder 325 and a scaler 335.

The image decoder 325 decodes the demultiplexed image signal and the scaler 335 scales the resolution of the decoded image signal to allow the display 180 to output the decoded image signal.

The image decoder 325 may include decoders of various standards.

The processor 330 may control overall operations of the components of the image display apparatus 100 or the components of the controller 170. For example, the processor 330 may control the tuner unit 110 to tune an RF broadcast corresponding to a channel selected by the user or a pre-stored channel.

The processor 330 may control the image display apparatus 100 according to a user command input through the user input interface unit 150 or according to an internal program.

The processor 330 may perform data transmission control with the network interface unit 135 or the external device interface unit 130.

In addition, the processor 330 may control operations of the demultiplexer 310, the image processing unit 320, the OSD generator 340 and the like in the controller 170.

The OSD generator 340 generates an OSD signal according to user input or by itself. For example, the OSD generator 340 may generate a signal for displaying various information in a graphic or text form on the screen of the display 180 based on a user input signal. The generated OSD signal may include various data such as a user interface screen, various menu screens, widgets, icons and the like of the image display apparatus 100. In addition, the generated OSD signal may also include a 2D object or a 3D object.

In addition, the OSD generator 340 may generate a pointer that can be displayed on the display 180 based on a pointing signal received from the remote control device 200. In particular, the pointer may be generated by a pointing signal processor (not shown) which may be included in the OSD generator 340. Of course, the pointing signal processor (not shown) may not be provided in she OSD generator 340 and may be provided separately.

In association with an embodiment of the present invention, upon logging in to the image display apparatus 100, the OSD generator 340 may generate or configure a preset personal screen. Alternatively, upon logging in to an accessed server, the OSD generator 340 may generate or configure at least a part of a server access screen received from the corresponding server to allow the server access screen to be displayed on the display 180. Alternatively, based on information regarding a web server that has accessed through personal information, the OSD generator 340 may generate or configure at least a part of a corresponding web server connection screen.

The mixer 345 may mix the OSD signal generated by the OSD generator 340 and the decoded image signal produced through image processing by the image processing unit 320, In this case, each of the OSD signal and the decoded image signal may include at least one of a 2D signal and a 3D signal. The mixed image signal is provided to the frame rate converter 350.

The frame rate converter 350 may convert the frame rate an input image. Meanwhile, the frame rate converter 350 may also directly output the input image without frame rate conversion.

The formatter 360 may receive and output the signals (i.e., the OSD signal and the decoded image signal) mixed by the mixer 345 after changing the format of the signals so as to be suitable for the display 180. For example, the formatter 360 may output R, G and B data signals which may be output through. Low Voltage Differential Signaling (LVDS) or mini-LVDS.

The formatter 360 may separate input signals into a 2D image signal and a 3D image signal for 3D image display. In addition, the formatter 360 may also change the format of the 3D image signal or may convert a 2D image signal into a 3D image signal.

The audio processor (not shown) in the controller 170 may perform audio processing on the demultiplexed audio signal. To this end, the audio processor (not shown) may include various decoders.

In addition, the audio processor (not shown) in the controller 170 may perform bass, treble, volume control or the like.

The data processor (not shown) in the controller 170 may implement data processing on the demultiplexed data signal. For example, the data processor (not shown) may decode the demultiplexed data signal when the demultiplexed data signal is an encoded data signal. The encoded data signal may be Electronic Program. Guide (EPG) information that includes start time, end time and the like of a broadcast program that is broadcast through each channel.

Although FIG. 2 shows an example in which the mixer 345 mixes signals from the OSD generator 340 and the image processing unit 320 and, thereafter, the formatter 360 performs 3D processing or the like on the mixed signals, the present invention is not limited to this example and the mixer 345 may be located behind the formatter 360.

The block diagram of FIG. 2 shows the configuration of the controller 170 according to the embodiment of the present invention. The respective components shown in the block diagram may be integrated, added or omitted according to the specifications of the controller 170 which is actually implemented.

In particular, the frame rate converter 350 and the formatter 360 may not be provided in the controller 170 and may be provided separately.

Figure 3:
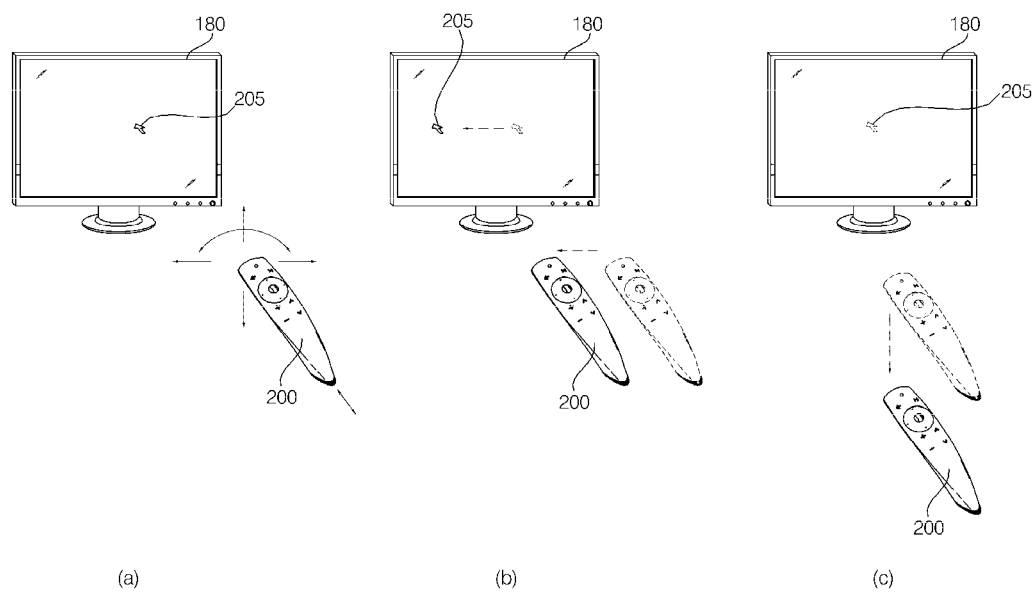
FIG. 3 is a view showing a control method of a remote control device shown in FIG. 1.

FIG. 3 shows a control method of the remote control device shown in FIG. 1.

In FIG. 3, (a) shows an example in which a pointer 205 corresponding to the remote control device 200 is displayed on the display 180.

The user may move the remote control device 200 upward and downward or leftward and rightward (as shown in (b) of FIG. 3) or forward and backward (as shown in (c) of FIG. 3), or may rotate the remote control device 200. The pointer 205 displayed on the display 180 of the image display apparatus corresponds to movement of the remote control device 200. Since the pointer 205 is displayed on the display 180 such that the pointer 205 is moved according to movement of the remote control device 200 in a 3D space as exemplarily shown in FIG. 3, the remote control device 200 may be referred to as a spatial remote controller (i.e. pointing device).

In FIG. 3, (b) shows an example in which, when the use moves the remote control device 200 leftward, the pointer 205 displayed on the display 180 of the image display apparatus is move leftward according to movement of the remote control device 200.

Information regarding movement of the remote control device 200 detected by a sensor (not shown) of the remote control device 200 is transmitted to the image display apparatus. The image display apparatus may calculate coordinates of the pointer 205 based on information regarding the movement of the remote control device 200. The image display apparatus may display the pointer 205 according to the calculated coordinates.

In FIG. 3, (c) shows an example in which the user moves the remote control device 200 away from the display 180 while pressing a specific button on the remote control device 200. This allows a selected area of the display 180 corresponding to the pointer 205 to be zoomed in and magnified. On the contrary, when the use moves the remote control device 200 nearer to the display 180 while pressing a specific button on the remote control device 200, a selected area of the display 180 corresponding to the pointer 205 may be zoomed out and demagnified. On the contrary, the selected area may be zoomed out when the remote control device 200 moves away from the display 180 and may be zoomed in when the remote control device 200 moves nearer to the display 180.

Detection of up-and-down movement and left-and-right movement of the remote control device 200 may be disabled when the specific button on the remote control device 200 is being pressed. That is, upward, downward, leftward and rightward movement of she remote control device 200 may not be detected and only forward and backward movement, of the remote control device 200 may be detected when the remote control device 200 is moving away from or nearer to the display 180. When the specific button on the remote control device 200 is not being pressed, only the pointer 205 is moved according to upward, downward, leftward and right movement of the remote control device 200.

Meanwhile, the moving speed or direction of the pointer 205 may correspond to a moving speed or direction of the remote control device 200.

Figure 4:
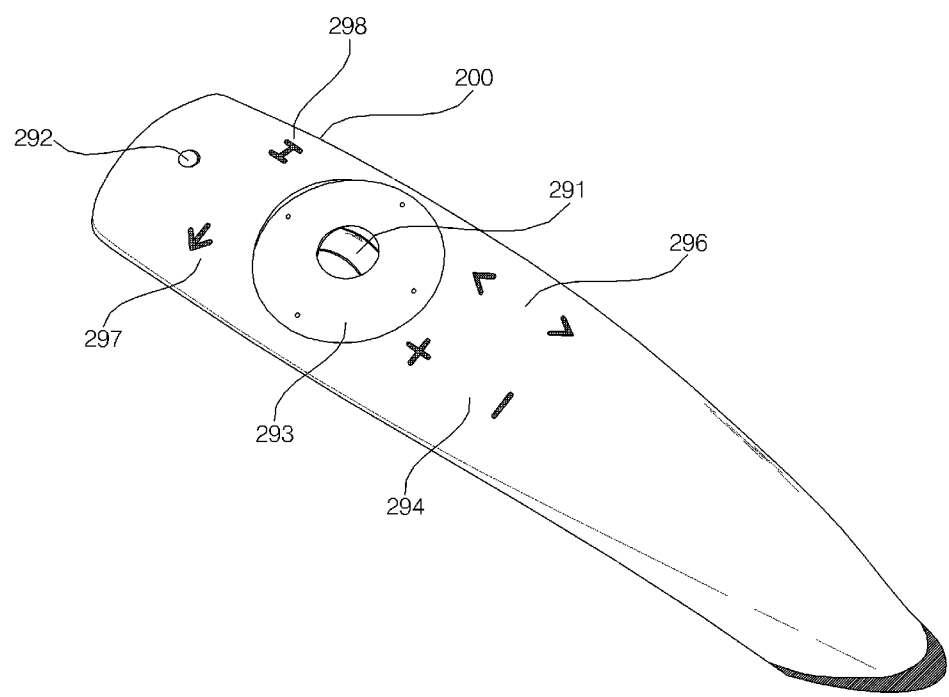
FIG. 4 is a perspective view of a remote control device according to one embodiment of the present invention.
Figure 5:
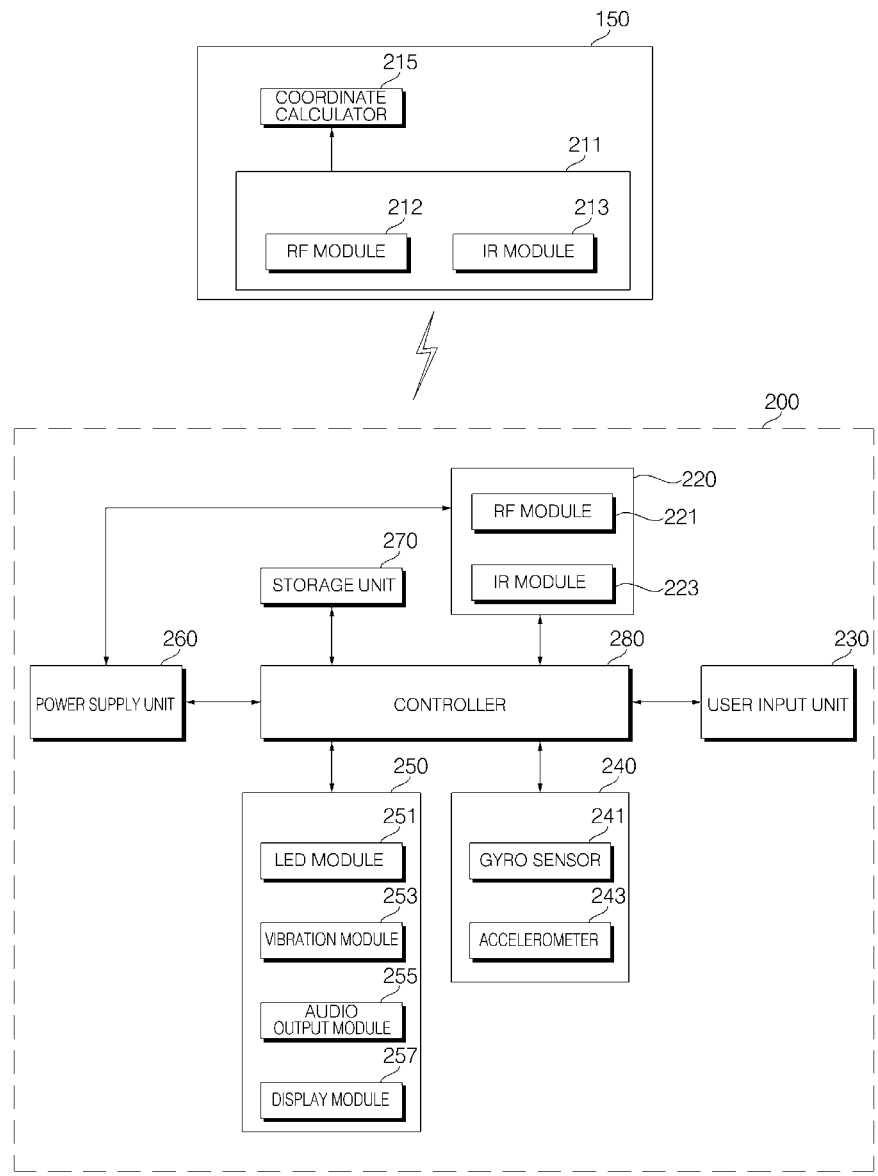
FIG. 5 is an internal block diagram of the remote control device according to one embodiment of the present invention.

FIG. 4 is a perspective view of the remote control device according to one embodiment of the present invention, and FIG. 5 is an internal block diagram of the remote control device.

Referring to FIG. 4, the pointing device 201 according to one embodiment of the present invention may include various input keys, input buttons or the like.

For example, the pointing device 201 may include an okay key 291, a menu key 292, a 4-way key 293, a channel control key 294 and a volume control key 296.

For example, the okay key 291 may be used to select a menu or item, the menu key 292 may be used to display a predetermined menu, the 4-way key 293 may be used to move a pointer or indicator up, down, left and right, the channel control key 294 may be used to move a channel up or down, and the volume control key 296 may be used for volume up and down control.

The pointing device 201 may further include a back key 297 and a home key 298. For example, the back key 297 may be used to move to a previous screen and the home key 298 may be used to move to a home screen.

As exemplarily shown in the drawing, the okay key 291 may further include a scroll function. To this end, the okay key 291 may be implemented as a wheel key. That is, when the okay key 291 is pushed, the okay key 291 is used to select a menu or item and, when the okay key 291 is scrolled up or down, the okay key 291 is used to scroll a display screen or to switch a list page.

More specifically, when the okay key 291 is scrolled for image searching in a state in which an image having a size greater than the size of the display 180 is displayed on the display 180, an image region which is not currently displayed is displayed on the display 180. In another example, when the okay key 291 is scrolled in a state in which a list page is displayed on the display 180, a previous page or a next page of a current page may be displayed.

Such a scroll function may be implemented by a key rather than the okay key 291.

The 4-way key 293 may include up, down, left and right keys in circular arrangement as exemplarily shown in the drawing. Meanwhile, touch input no the 4-way key 293 may be possible. For example, when touch motion from the up key to the down key in the 4-way key 293 is implemented, a preset function may be input or implemented according to the corresponding touch input.

Referring to FIG. 5, the remote control device 200 may include a radio communication unit 220, a user input unit 230, a sensor unit 240, an output unit 250, a power supply unit 260, a storage unit 270 and a controller 280.

The radio communication unit 220 transmits and receives a signal to and from any one of the image display apparatuses according to the embodiments of the present invention. Among the image display apparatuses according to the embodiments of the present invention, the image display apparatus 100 will be described below by way of example.

In the present embodiment, the remote control device 200 may include an RF module 221 which transmits and receives a signal to and from the image display apparatus 100 according to an RF communication standard. In addition, the remote control device 200 may include an IR module 223 which transmits and receives a signal to and from the image display apparatus 100 according to an IR communication standard.

The remote control device 200 may further include an NFC module (not shown) for near field communication with an electronic device.

The remote control device 200 may transmit information regarding movement of the remote control device 200 and the like to the image display apparatus 100 via the RF module 221.

In addition, the remote control device 200 may receive the signal from the image display apparatus 100 via the RF module 221. In addition, the remote control device 200 may transmit a command associated with power on/off, channel switching, volume change or the like to the image display apparatus 100 via the IR module 223.

According to the present embodiment, the remote control device 200 may receive personal information by near field communication with an electronic device.

The remote control device 200 may transmit the received personal information to the image display apparatus 100. In this case, an IR or RF scheme may be used as a communication method.

The remote control device 200 may further receive personal information and information regarding a web server which has accessed through the personal information. For example, the remote control device 200 may receive web server information related to a social network service which has been logged in and accessed by a mobile terminal. Such web server information may also be transmitted to the image display apparatus 100.

The remote control device 200 may receive device information of another electronic device, remote controllable channel information, frequency information or code information of another electronic device or the like. The remote control device 200 may implement remote control by allotting a channel, frequency or code to the corresponding electronic device based on the information regarding another electronic device.

The user input unit 230 may include a keypad, keys (buttons), a touch pad, a touchscreen or the like. The user may input a command related to the image display apparatus 100 to the remote control device 200 by operating the user input unit 230. When the user input unit 230 includes hard keys, the user may input a command related to the image display apparatus 100 to the remote control device 200 by pushing the hard keys. When the user input unit 230 includes a touchscreen, the user may input a command related to the image display apparatus 100 to the remote control device 200 by touching soft keys on the touchscreen in addition, the user input unit 230 may include a variety of input means which may be manipulated by the user, such as a scroll key, a log key, etc., and the scope of the present invention is not limited by the present embodiment.

The sensor unit 240 may include a gyro sensor 241 or an accelerometer 243. The gyro sensor 241 may sense information regarding movement of the remote control device 200.

For example, the gyro sensor 241 may sense information regarding operation of the remote control device 200 on the basis of X-, Y- and Z-axes. The accelerometer 243 may sense information regarding the moving speed of the remote control device 200. The sensor unit 240 may further include a distance measurement sensor which senses a distance from the display 180. Alternatively, the sensor unit 240 may include a geomagnetic sensor which detects the flow of a magnetic field generated by earth and detects a compass bearing to detect change in the compass bearing.

The output unit 250 may output a video or audio signal corresponding to manipulation of the user input unit 230 or a signal transmitted from the image display apparatus 100. The user may recognize whether the user input unit 203 has been manipulated or the image display apparatus 100 has been controlled via the output unit 250.

For example, the output unit 250 may include a Light Emitting Diode (LED) module 251 which is turned on via manipulation of the user input unit 230 or upon receiving and transmitting a signal from and to the image display apparatus 100 via the radio communication unit 225, a vibration module 253 which generates vibration, an audio output module 255 for audio output, or a display module 257 for video output.

The power supply unit 260 supplies power to the remote control device 200. When the remote control device 200 is kept stationary for a predetermined time, the power supply unit 260 intercepts supply of power to the remote control device 200, which may reduce power consumption. When a predetermined key of the remote control device 200 is manipulated, the power supply unit 260 may resume the supply of power.

The storage unit 270 may store a plurality of types of programs required for control or operation of the remote control device 200, application data or the like. When the remote control device 200 transmits and receives a signal to and from the image display apparatus via the RF module 221 in a wireless manner, the remote control device 200 and the image display apparatus 100 implement signal transmission and reception in a predetermined frequency band. The controller 280 of the remote control device 200 may store information regarding the frequency band, in which the image display apparatus 100 and the remote control device 200 paired with each other may transmit and receive a signal in a wireless manner, and refer to the information.

In addition, the storage unit 270 may store IR format key codes for control of other electronic devices as IR signals and store an IR format key database of a plurality of electronic devices.

The controller 280 controls overall control operations of the remote control device 200. The controller 280 may transmit a signal corresponding to manipulation of a predetermined, key on the user input unit 230 or a signal corresponding to movement of the remote control device 200 sensed by the sensor unit 240 to the image display apparatus 100 via the radio communication unit 225.

The controller 280 may control transmission of the received personal information to the image display apparatus 100 through the radio communication unit 220 by near field communication with an electronic device. In particular, when predetermined key input of the user input unit 230 is implemented, the controller 280 may control transmission of the received personal information to the image display apparatus 100 through the radio communication unit 220.

In addition, the controller 280 may control transmission of the received personal information to an electronic device other than the image display apparatus 100. In this case, different channels, frequencies or codes may be used with respect to respective electronic devices. Such channels, frequencies or codes may be based on device information, remote controllable channel information, frequency information or code information previously received from another electronic device.

The user input interface unit 150 of the image display apparatus 100 may include a radio communication unit 211 which may transmit and receive a signal so and from the remote control, device 200 in a wireless manner, and a coordinate calculator 215 which calculates the coordinates a pointer corresponding to operation of the remote control device 200.

The user input interface unit 150 may transmit and receive a signal to and from the remote control device 200 in a wireless manner via an RF module 212. The user input interface unit 150 may also receive a signal from the remote control device 200 via an IR module 213 based on the IR communication standard.

The coordinate calculator 215 may calculate the coordinates (x, y) of the pointer to be displayed on the display 180 by correcting handshaking or errors from a signal corresponding to operation of the remote control device 200 received through the radio communication unit 211.

A signal transmitted from she remote control device 200 to the image display apparatus 100 via the user input interface unit 150 is transmitted to the controller 170 of the image display apparatus 100. The controller 170 may identify information regarding operation of the remote control device 200 or key manipulation on the remote control device 200 from the signal received from the remote control device 200 and then control the image display apparatus 100 according to the information.

In another example, the remote control device 200 may calculate the coordinates of she pointer corresponding to the operation thereof and output the coordinates to the user input interface unit 150 of the image display apparatus 100. In this case, the user input interface unit 150 of the image display apparatus 100 may transmit information regarding the received pointer coordinates to the controller 170 without correcting handshaking or errors.

In a further example, the coordinate calculator 215 may be included in the controller 170 rather than being included in the user input interface unit 150, differently from the drawing.

Figure 6:
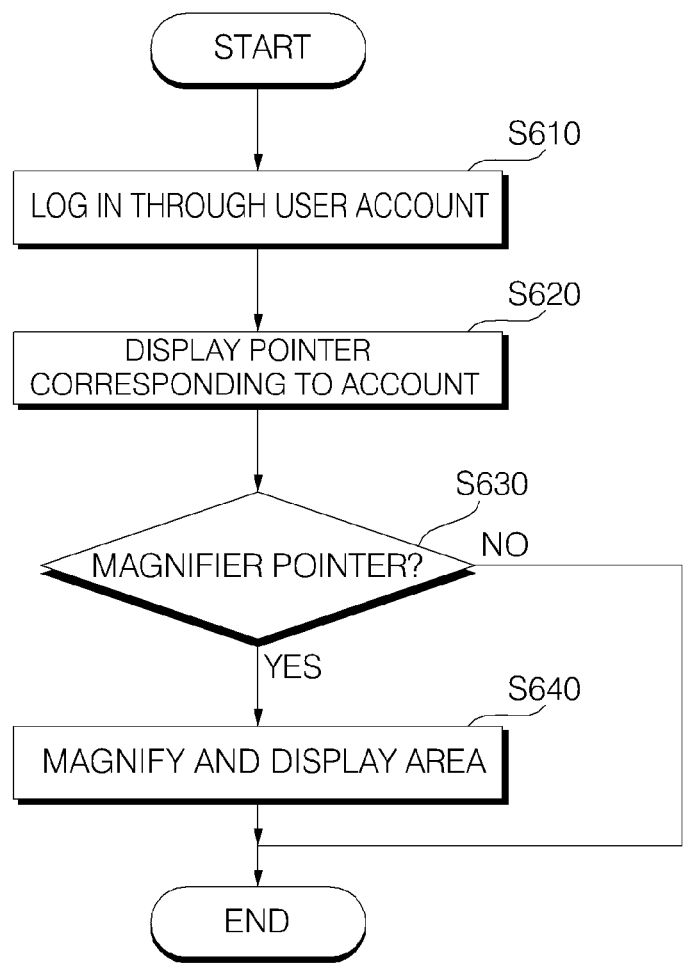
FIG. 6 is a flowchart showing an operating method of an image display apparatus according to one embodiment of the present invention.

FIG. 6 is a flowchart showing an operating method of an image display apparatus according to one embodiment of the present invention, and FIGS. 7 to 13 are reference views for explanation of the operating method of the image display apparatus according to the embodiment of the present invention.

Referring to the drawings, login to the image display apparatus using a user account is implemented based on a user command or in an automated manner (S610).

Since the image display apparatus is frequently shared by family members, a procedure of allowing a user who wishes to use a personalized function to directly log in to the image display apparatus may be basically set.

According to an embodiment, when recognition of the user's face using a camera or other user identification, such as fingerprint or iris recognition, etc., is possible, the image display apparatus may be set to allow automated login thereto using an account of the identified user.

Alternatively, according to an embodiment, the image display apparatus may be set to allow automated login thereto using an account of a user who lastly logged in.

After logging in, a pointer corresponding to the user account among a plurality of pointers may be displayed on the display 180 (S620).

Figure 7:
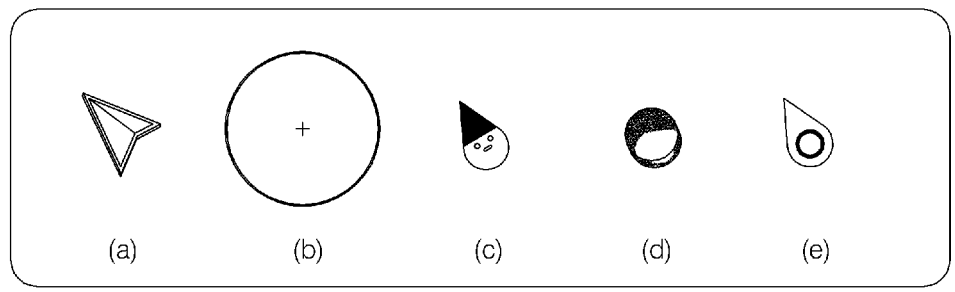
FIGS. 7 to 13 are reference views for explanation of the operating method of the image display apparatus according to the embodiment of the present invention.

FIG. 7 shows some of a plurality of pointer shapes that may be provided by the image display apparatus according to the present invention.

The image display apparatus according to the present invention may provide several kinds of pointers to expand the range of choice of the user.

In addition, the image display apparatus according to the present invention may personalize functions on a per user basis to provide the user with an optimized pointer.

Describing the case in which family members use the image display apparatus by way of example, a father user may use a pointer shown in (a) of FIG. 7, a grandfather user may use a pointer shown in (b) of FIG. 7, a child user may use a pointer shown in (c) of FIG. 7 and a mother user may use a pointer shown in (d) of FIG. 7.

A pointer selected based on user login information after initial setting may be automatically set to a basic pointer.

In addition to visual graphic change with regard to the pointers, new functions related to the remote control device and the pointers may be added to provide user convenience.

For example, graphical preferences of a person who logs in may be considered and an additional function, such as a magnifier function, may be provided.

When the pointer is a magnifier pointer that enables change of magnification ((b) of FIG. 7) (S630), an area around coordinates corresponding to a position of the pointer may be displayed in a magnified version (S640). In addition, the magnification may be changed by input to a wheel or prescribed key of the remote control device 200.

Figure 8:
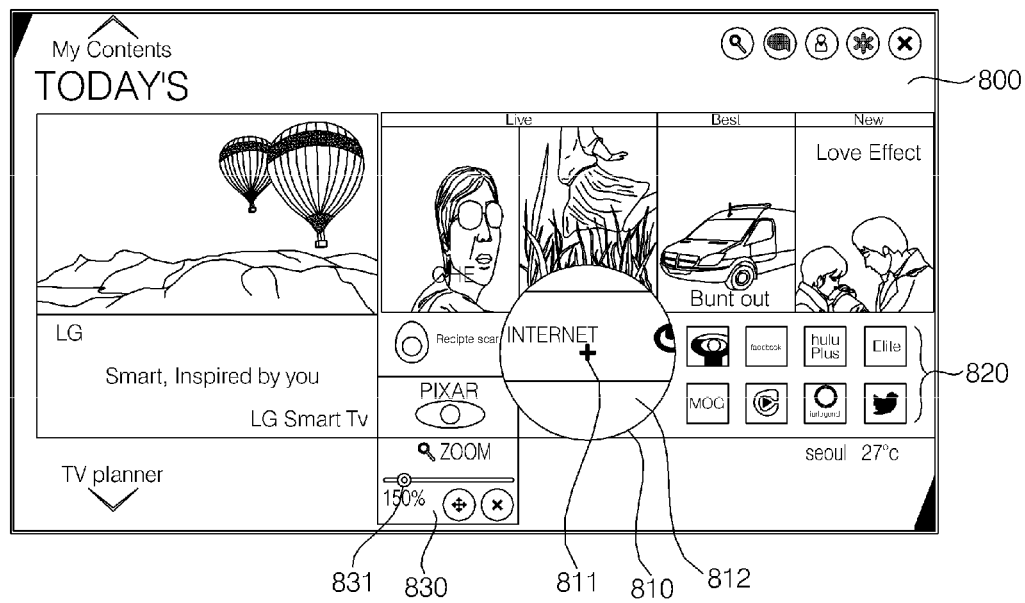
Figure 9:
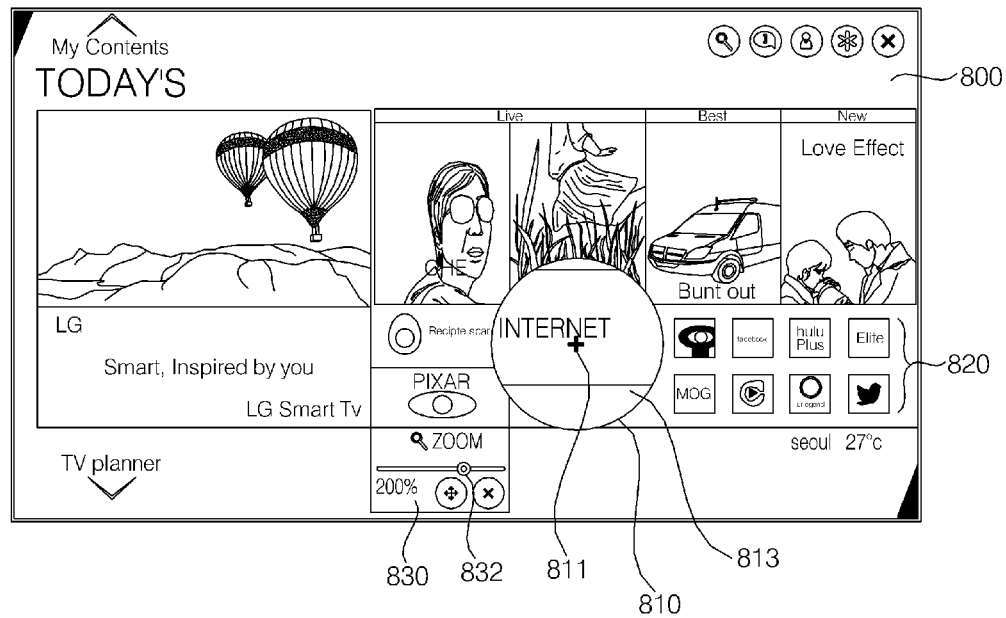

Referring to FIGS. 8 and 9, a magnifier pointer 810 corresponding to a given user account is displayed on a screen 800. The magnifier pointer 810 may include a cross mark 811 at a center position thereof corresponding to the coordinates of the position thereof. The cross mark 811 may assist the user in accurately controlling the magnifier pointer 810.

In addition, the magnifier pointer 810 may include a magnifying area 812 which magnifies and displays an area around coordinates corresponding to a position of the pointer 810.

A magnifier zoom interface 830 is an interface that can allow the user to adjust the magnification of a magnifier from X % to Y %. The user may call the magnifier zoom interface 830 for change of magnification.

In addition, the magnification may be changed based on input to a wheel or prescribed key of the remote control device 200.

Once the magnifier pointer 810 is displayed on the screen 800, the magnifier zoom interface 830 that displays the magnification of a magnifier may be further displayed.

Alternatively, the magnifier zoom interface 830 may not be displayed during usual operation of the magnifier pointer 810 and may be displayed for a predetermined time only upon change of magnification and then disappear, or may be displayed in response to a user menu call.

Considering the magnifier zoom interface 830 of FIGS. 8 and 9, indicators 831 and 832, which are adapted to move based on magnification, represent 150% magnification by a magnifier and 200% magnification by a magnifier respectively.

Meanwhile, objects may be further displayed around the magnifier pointer 810.

The objects displayed around the magnifier pointer 810 may be objects selected by the pointer 810 or associated with a focused item.

In one example, when the magnifier pointer 810 focuses on a specific function, additional information regarding the selected function may be displayed next to the magnifier pointer 810.

In another example, when the magnifier pointer 810 focuses on a menu item, the objects may be sub-menu items of the selected menu item.

Figure 10:
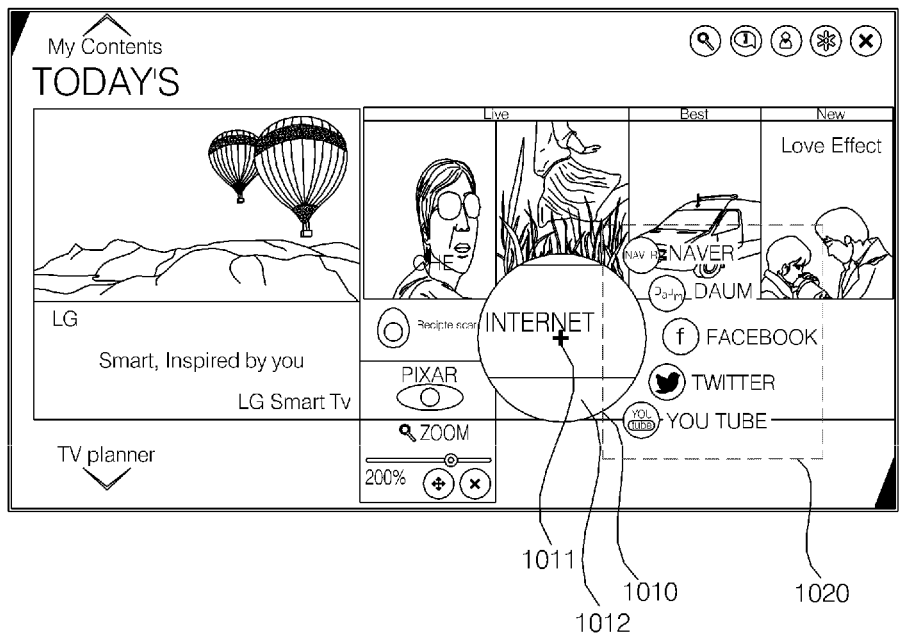

Referring to FIG. 10, when a magnifier pointer 1010 focuses on a specific function, sub-depth (2 depths) information regarding the function may be displayed around the magnifier pointer 1010. The user may previously know what function the user can select by clicking the information to enter the function.

An item where a center mark 1011 of the magnifier pointer 1010 is located may be judged as a focused item, or focused items may be judged on the basis of a magnifying area 1012.

With regard to other shapes of pointers except for the magnifier pointer 1010, an additional menu or information related to a focused or selected item may be further displayed around the corresponding pointer.

A number of pointers according to the embodiment of the present invention as well as the magnifier pointer may be automatically changed in shape according to use situations.

Figure 11:
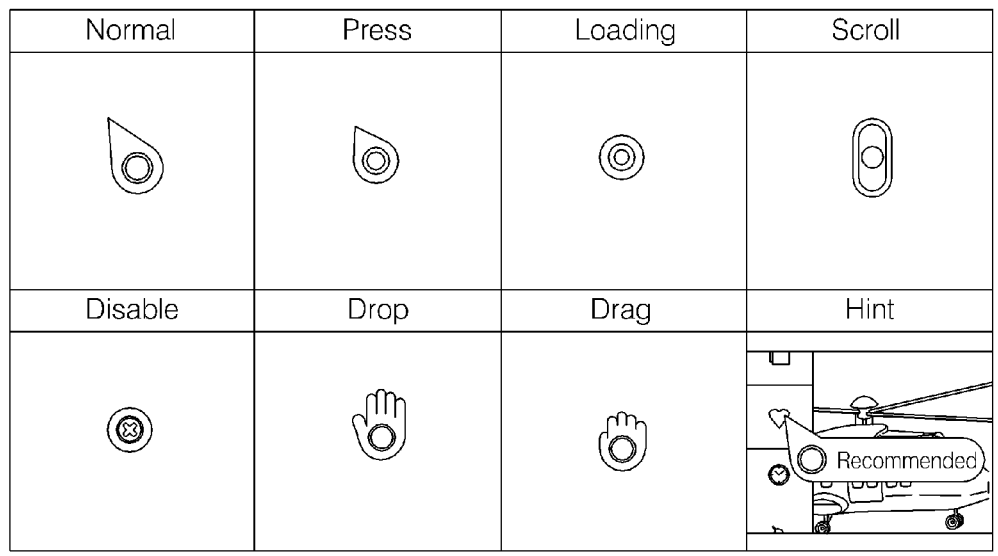

FIG. 11 shows change in the shape of a pointer according to each operation situation.

In one embodiment of the present invention, the shape of a pointer may be changed according to various possible use situations as exemplarily shown in FIG. 11.

Based on the shape of the pointer, the user may more accurately check an action that the user takes using the remote control device in a visual manner.

Figure 12:
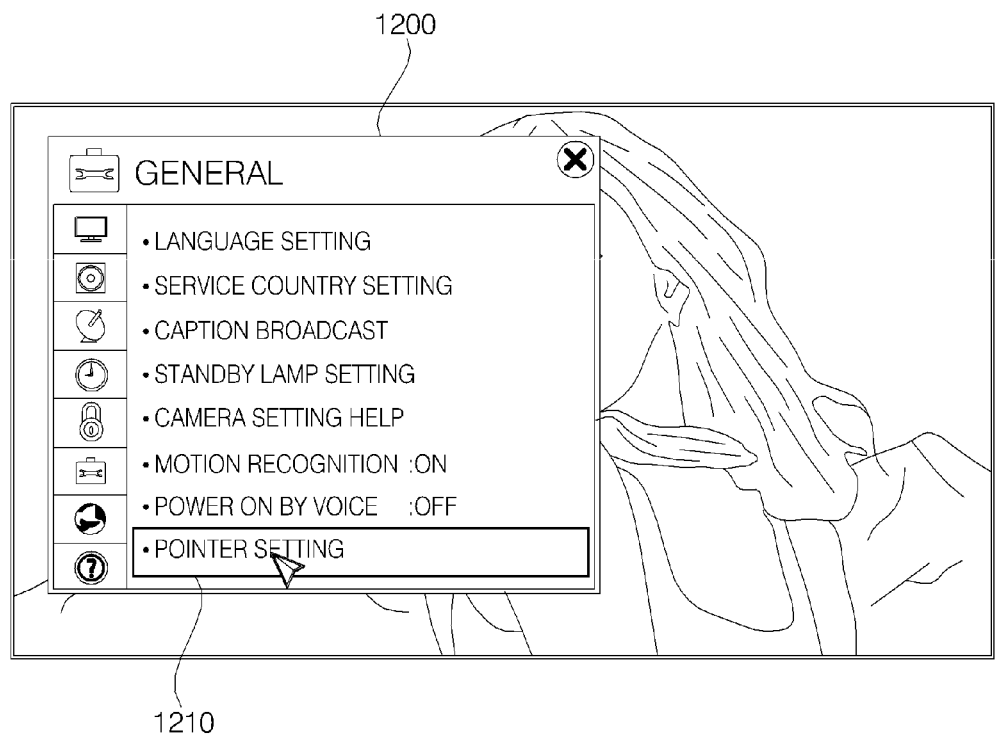
Figure 13:
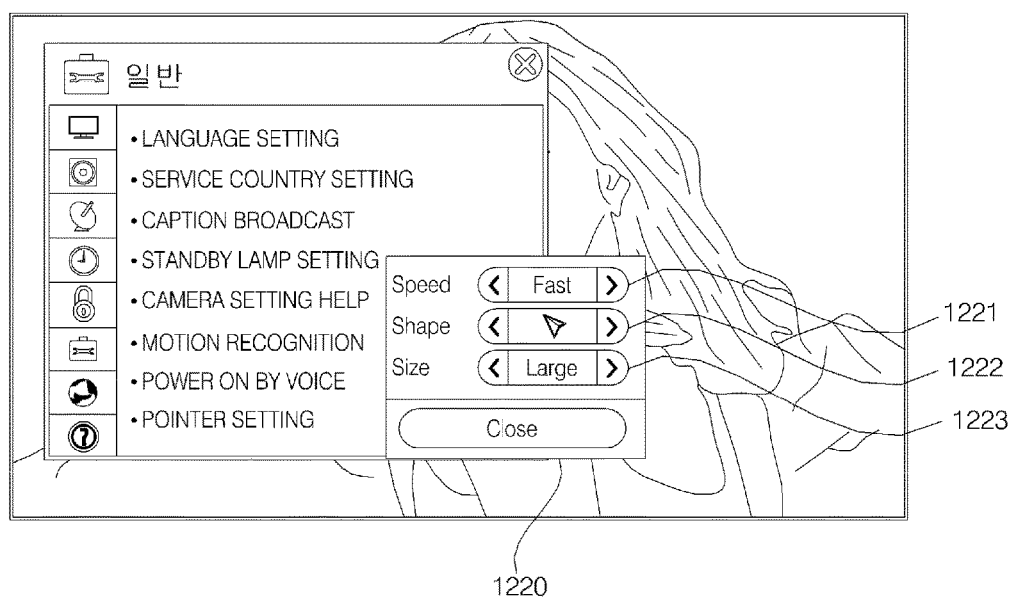

FIGS. 12 and 13 show an example of initially setting the shape of a pointer.

Referring to FIGS. 12 and 13, the user may select a pointer that the user will use and set a feature of the pointer by selecting a pointer setting item 1210 from a setting menu 1200 after logging in.

FIG. 13 shows a detail setting item 1220 including a pointer speed 1221, a pointer shape 1222 and a pointer size 1223.

Even in a situation in which the user does not log in, change in the setting of a pointer and use of the pointer are possible until another user logs in.

According to an embodiment, when the user who has not logged in attempts to change setting of a pointer, a message and a menu announcing that the user has not logged in and assisting the user in checking whether or not to log in and to use a user account may be displayed.

According to the present invention, the pointers may be visually differentiated to provide visual graphic change and may also provide various functions.

In addition, the present invention may personalize functions on a per user basis to provide a personalized pointer.

Figure 14:
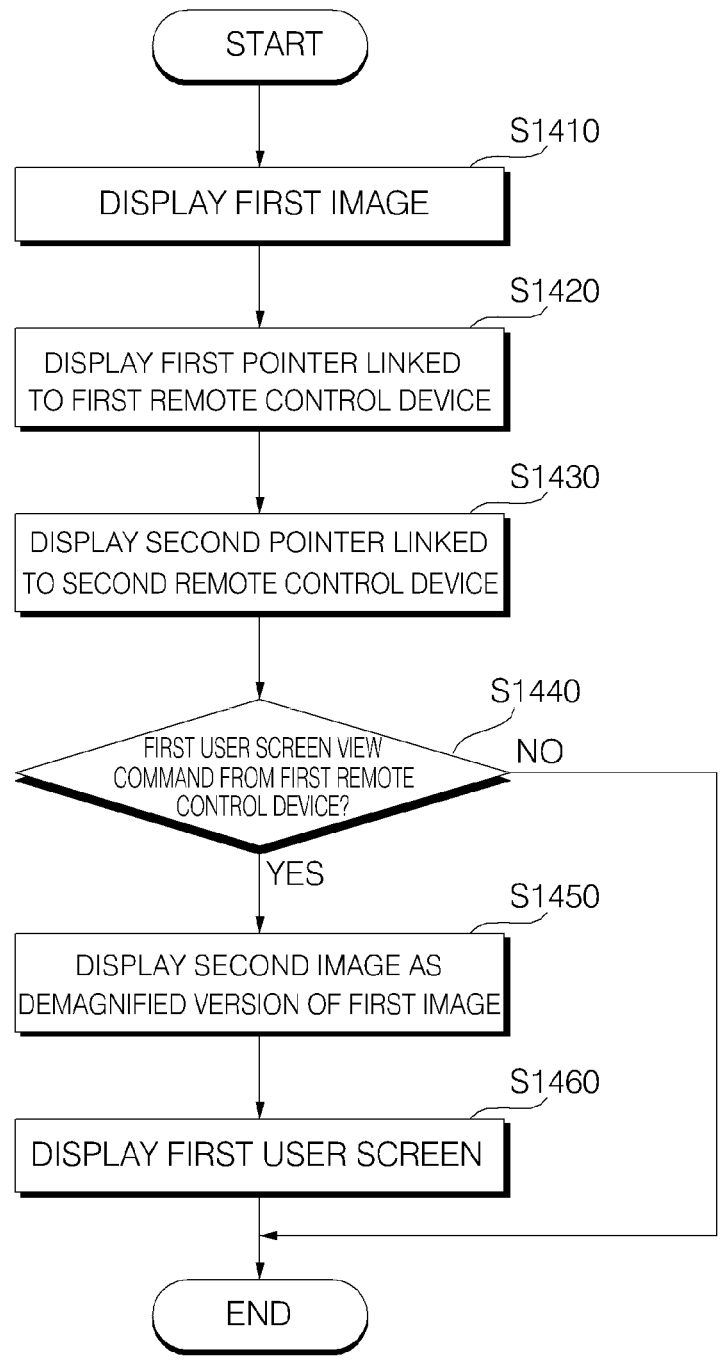
FIG. 14 is a flowchart showing an operating method of an image display apparatus according to one embodiment of the present invention.

FIG. 14 is a flowchart showing an operating method of an image display apparatus according to one embodiment of the present invention, and FIGS. 15 to 27 are reference views for explanation of the operating method of the image display apparatus according to the embodiment of the present invention.

Referring to the drawings, a first image 1510 may be displayed on the display 180 (S1410), and a first pointer 1521 linked to a first remote control device may be displayed on the display 180 (S1420).

Figure 15:
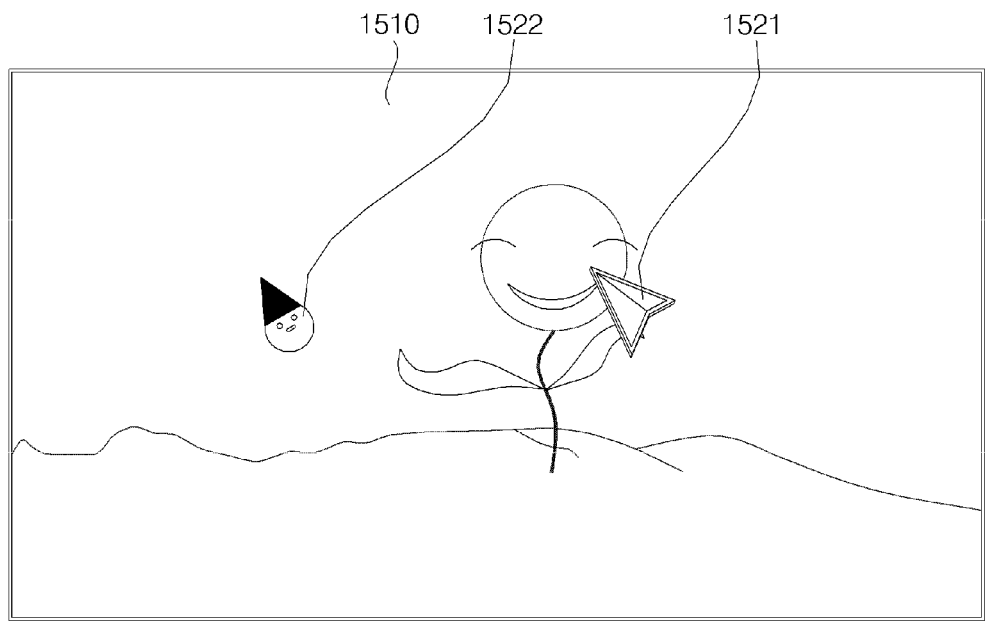
FIGS. 15 to 27 are reference views for explanation of the operating method of the image display apparatus according to the embodiment of the present invention.

For example, as exemplarily shown in FIG. 15, the broadcast image 1510 may be displayed on the display 180 (S1410), and the first pointer 1521 linked to the first remote control device may be displayed on the display 180 (S1420).

The first pointer 1521 may be displayed when corresponding operation occurs, such as, for example, when the first remote control device is paired with the image display apparatus 100, when the first remote control device that has completed pairing and been used wakes up from a sleep mode, or when the first remote control device implements movement of a predetermined magnitude or more.

The first remote control device may be a pointing device as described above, and the image display apparatus 100 may display the first pointer based on movement of the paired first remote control device.

Thereafter, when corresponding operation occurs, such as, for example, when a second remote control device different from the first remote control device is paired with the image display apparatus 100, when the second remote control device that has completed pairing and been used wakes up from a sleep mode, or when the second remote control device implements movement of a predetermined magnitude or more, a second pointer 1522, which is linked to the second remote control device and has a different shape than the first pointer 1521, may be displayed on the display 180 (S1430).

Alternatively, when motion of a predetermined magnitude or more is input from the remote control device without touch input, a pointer may be displayed on an area corresponding to the remote control device.

According to an embodiment, the first and second pointers 1521 and 1522 may be displayed in shapes preset on a per remote control device basis. That is, the image display apparatus 100 may discriminate remote control devices that are being used to display pointers corresponding to the respective remote control devices.

Alternatively, the image display apparatus 100 may display the first and second pointers 1521 and 1522 having different shapes based on an account of a user who is using the remote control device.

Since the image display apparatus is frequently shared by family members, a procedure of allowing a user who wishes to use a personalized function to directly log in to the image display apparatus may be basically set.

According to an embodiment, when recognition of the user's face using a camera or other user identification, such as fingerprint or iris recognition, etc., is possible, the image display apparatus may be set to allow automated login thereto using an account of the identified user.

Alternatively, according to an embodiment, the image display apparatus may be set to allow automated login thereto using an account of a user who lastly logged in.

Figure 16:
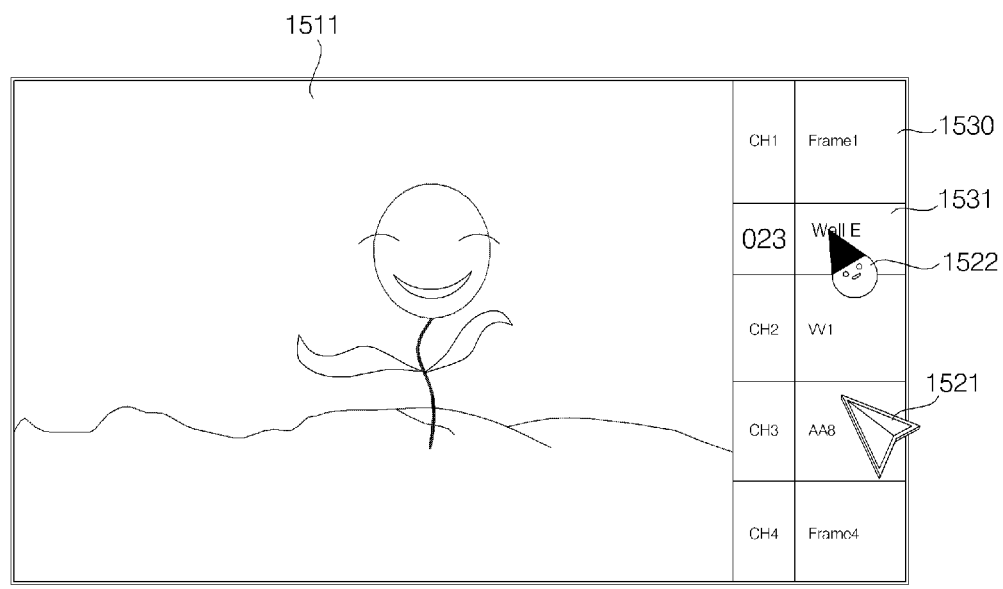

When the image display apparatus 100 receives a first user screen view command from the first remote control device (S1440), as exemplarily shown in FIG. 16, a second image 1511 acquired by demagnifying the first image 1510 may be displayed (S1450), and a first user screen 1530 may be displayed on an area of the display 180 where the second image 1511 is not displayed (S1460).

That is, upon receiving the first user screen view command (S1440), the image display apparatus 100 may demagnify the main image 1510 that the user has viewed or used and may display the first user screen 1530 (S1460).

Likewise, upon receiving a second user screen view command from the second remote control device, the image display apparatus 100 may demagnify the main image that the user has viewed or used and may display a second user screen.

The first user screen 1530 may be displayed at one of upper, lower, left and right sides of the second image 1511.

Alternatively, according to an embodiment, instead of demagnifying the main image, a user screen may overlap the main image to be displayed over the main image.

The first user screen 1530 may include recommended content items based on user information or device information from the first remote control device.

The controller 170 may determine pre-stored or linked user history based on the received device information or user information and then control recommendation of the most frequency used content, content of the most frequency used category and content of popularity order to the user based on the determined user history.

Alternatively, the first user screen 1530 may include recommended content items based on the kind of the first image 1510. The controller 170 may determine the kind of the first image 1510 that is currently displayed. For example, when the first image 1510 is a broadcast image, the first user screen 1530 may be a channel banner screen including information regarding plural channels. The user may implement channel switching using one item included in the channel banner screen.

When the first image 1510 is a broadcast image, the controller 170 may acquire related information, such as the program title of the broadcast image that is currently displayed, etc., by checking an Electronic Program Guide (EPG) and then recommend content related to the acquired information.

In addition, the controller 170 may provide a user screen including recommended content by combining device information of the remote control device, input user information and currently used content information.

When the image display apparatus 100 receives input to any one item 1531 included in the first user screen 1530 from the first remote control device or the second remote control device in a state in which the first and second pointers 1521 and 1522 and the first user screen 1530 are displayed (S1430), the image display apparatus 100 may execute operation corresponding to the received input.

The controller 170 may control execution of different operations upon reception of input from the first remote control device and upon reception of input from the second remote control device.

For example, upon reception of input from the first remote control device, the controller 170 may execute operation corresponding to the item 1531 of the received input. When a channel item included in a channel banner is selected, the controller 170 may implement channel switching to the corresponding channel. According to an embodiment, a second user may be required to agree to channel switching.

In addition, upon reception of input from the second remote control device, the controller 170 may control display of a second user screen 1540 on a partial area of the display 180.

Figure 17:
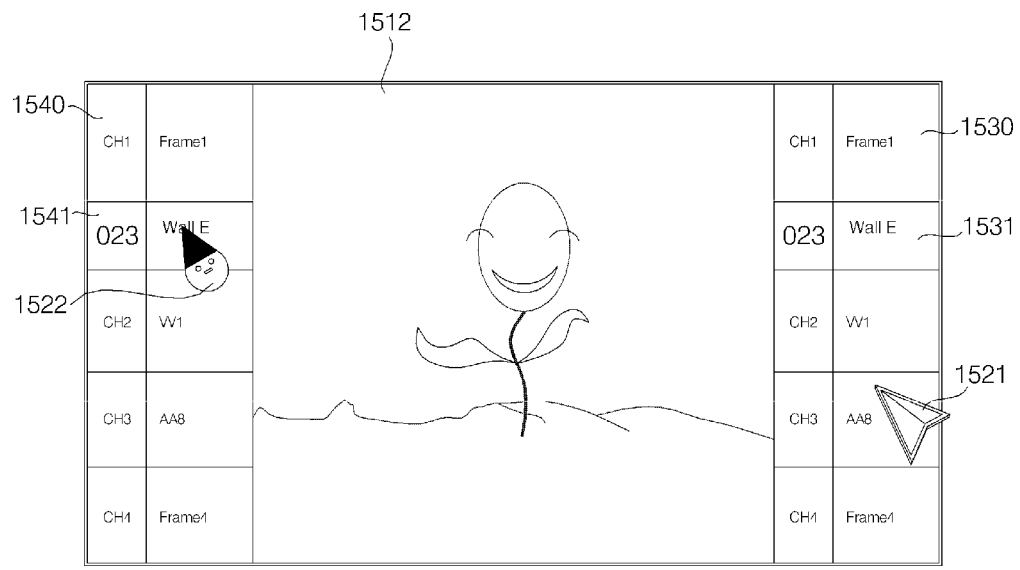

FIG. 17 shows an embodiment in which the second user screen 1540 is displayed upon reception of input from the second remote control device in a state in which the first user screen has been displayed.

Even in this case, as the user screen is additionally displayed, the previously displayed main image may be displayed in a demagnified version.

For example, the controller 170 may control display of a third image 1512 as a demagnified version of the second image 1511 on the display 180.

The second user screen 1540 may include items based on the item 1531 of the received input.

Referring to FIGS. 16 and 17, when the first user screen 1530 is a channel banner screen and the selected item 1531 is a channel item, the second user screen 1540 may be the same channel banner screen as the first user screen 1530, a screen including program information of a corresponding channel including the selected item 1531 or a screen including detailed information related to the selected item 1531.

The controller 170 may control automated movement of the second pointer 1522 to the second user screen 1540 and display of the second pointer 1522.

More particularly, the second pointer 1522 may be displayed over an item 1541 of the second user screen 1540 which is equal to or corresponds to the item 1531 selected from the first user screen 1530. Alternatively, the second pointer 1522 may be automatically moved to the center of the second user screen 1440.

FIGS. 18 to 21 show an example of using an application screen. Specifically, FIGS. 15 to 17 show the case in which the first and second remote control devices are operated while the user is viewing a broadcast image as a first image, and FIGS. 18 to 21 show the case in which the first and second remote control devices are operated while the user is viewing an application screen as a first image.

Figure 18:
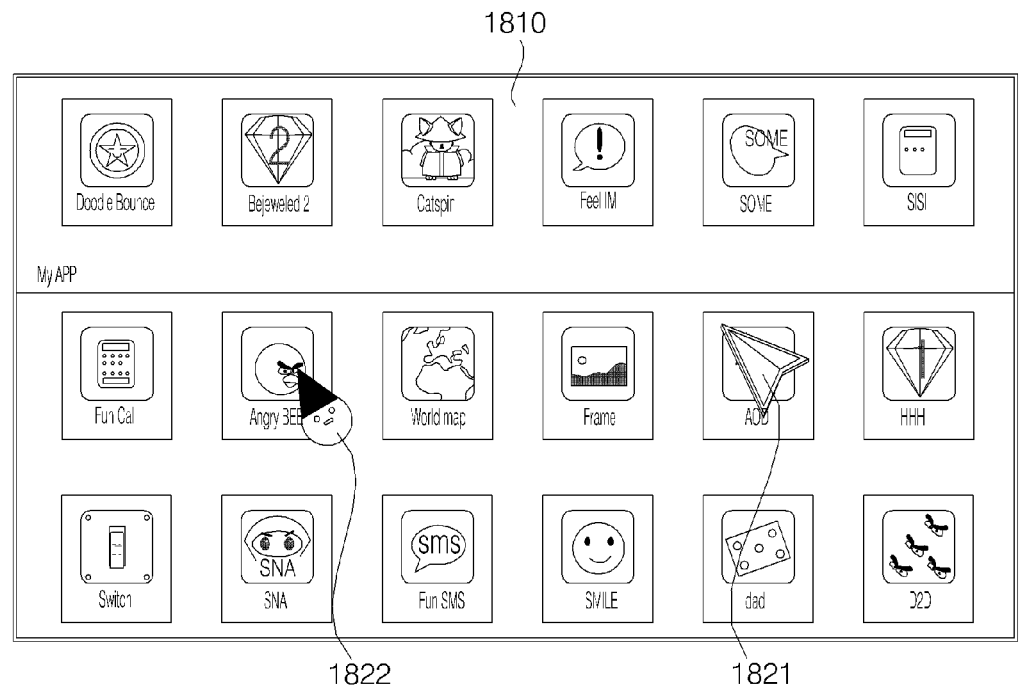

Referring to FIG. 18, a first image 1810 in the form of an application screen may be displayed on the display 180 and first and second pointers 1821 and 1822, which are linked to the first and second remote control devices moved by different users, may be displayed on the display 180.

Figure 19:
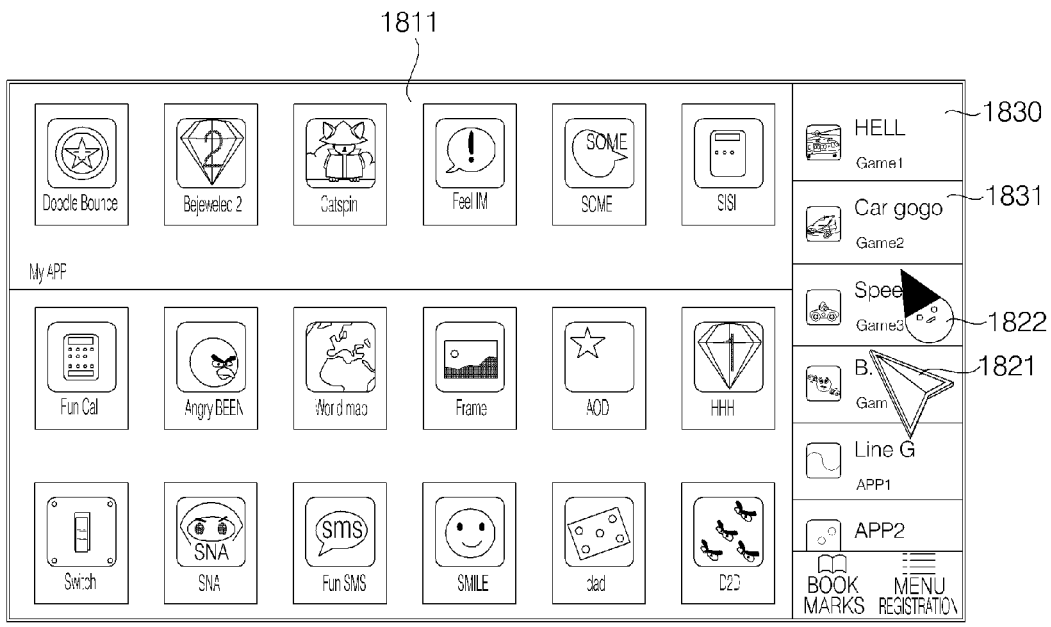

In this case, when the user of the first remote control device transmits a first user screen view command to the image display apparatus 100, as exemplarily shown in FIG. 19, a second image 1811, which is a demagnified version of a main image, i.e. the first image 1810, may be displayed and a first user screen 1830 may be displayed on an area of the display 180 where the second image 1811 is not displayed.

The first user screen 1830 may include recommended application items based on the first image 1810 in the form of an application screen.

Alternatively, the first user screen 1830 may be a recent application screen corresponding to the first remote control device or a first user account, or may be a bookmark application screen.

When the image display apparatus 100 receives input to any one item 1831 included in the first user screen 1830 from the first remote control device or the second remote control device in a state in which the first and second pointers 1821 and 1822 and the first user screen 1830 are displayed, the image display apparatus 100 may execute operation corresponding to the received input.

The controller 170 may control execution of different operations upon reception of input from the first remote control device and upon reception of input from the second remote control device.

For example, upon reception of input from the first remote control device, the controller 170 may execute an application corresponding to the item 1831 of the received input.

In this case, an execution screen of the application may be displayed in the first user screen 1830. According to an embodiment, the execution screen of the application may be converted into a main image and displayed as the main image.

In addition, upon reception of input from the second remote control device, the controller 170 may control display of a second user screen 1840 on a partial area of the display 180. Here, the second user screen 1840 may be a screen including the same recommended application as the first user screen 1830, or may be a screen including items associated with at least one selected item.

The image display apparatus 100 may receive device information of the remote control device or user information from the first and second remote control devices via the user input interface unit 150, and the controller 170 may determine whether or not use of the item of the received input is possible based on the received device information or user information.

Upon determining that use of the item 1831 of the received input is impossible, the controller 170 may control implementation of a purchase, installation or certification process related to the item 1831 of the received input. As exemplarily shown in FIG. 20, the second user screen 1840 may be one of purchase, installation and certification screens related to the item 1831 of the received input.

Alternatively, upon determining that use of the item 1831 of the received input is possible, the controller 170 may control execution of the item 1831 of the received input. As exemplarily shown in FIG. 21, the second user screen 1840 may be an execution screen of the item 1831 of the received input.

Figure 20:
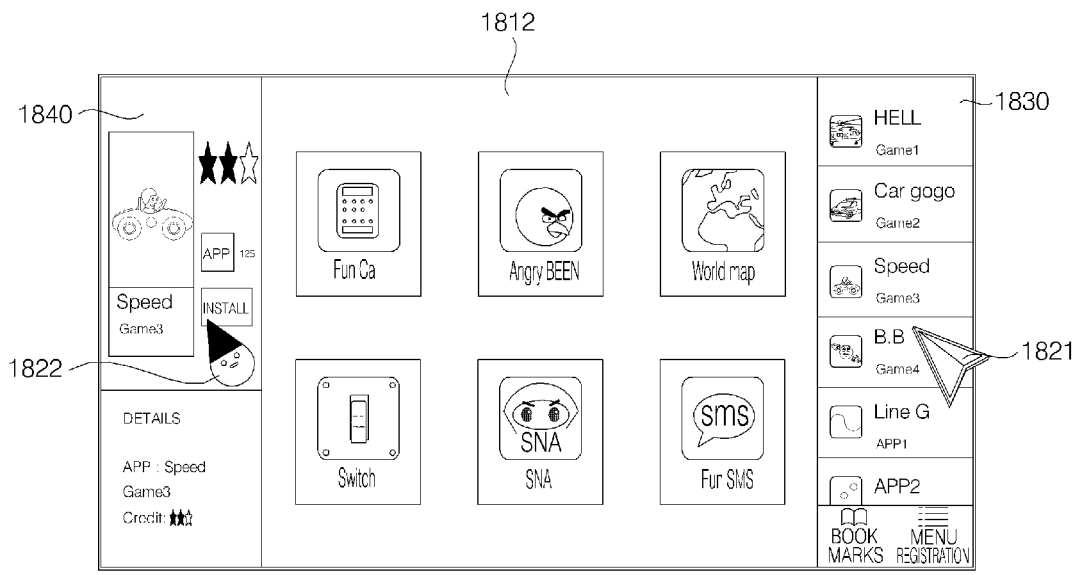
Figure 21:
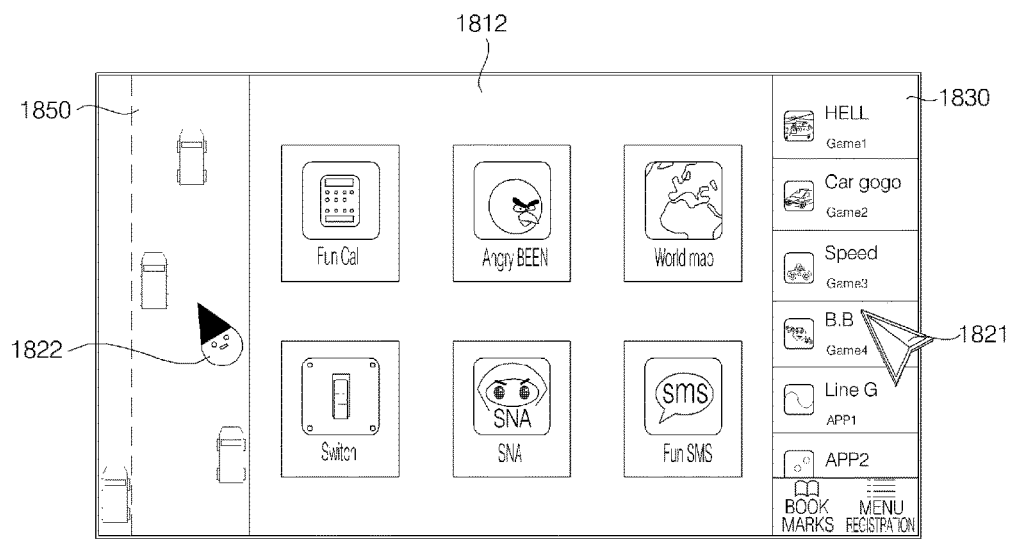

FIGS. 18 and 19 show an example in which the second image 1811 is a horizontally demagnified version of the first image 1810. FIGS. 19 and 20 show an example in which a third image 1812 is smaller than the second image 1811 and is changed in the number and size of applications included therein. As the user screen is additionally displayed, the main image may be demagnified and the number, size and kind of items included in the main image may be changed.

As exemplarily shown in FIGS. 18 to 21, the second user screen may be different from the first user screen although the second user screen is based on the first user screen.

Even in the case of the user screen in the form of a channel banner as described above with reference to FIGS. 15 to 17, the first and second user screens may be different screens although they are related to each other.

Figure 22:
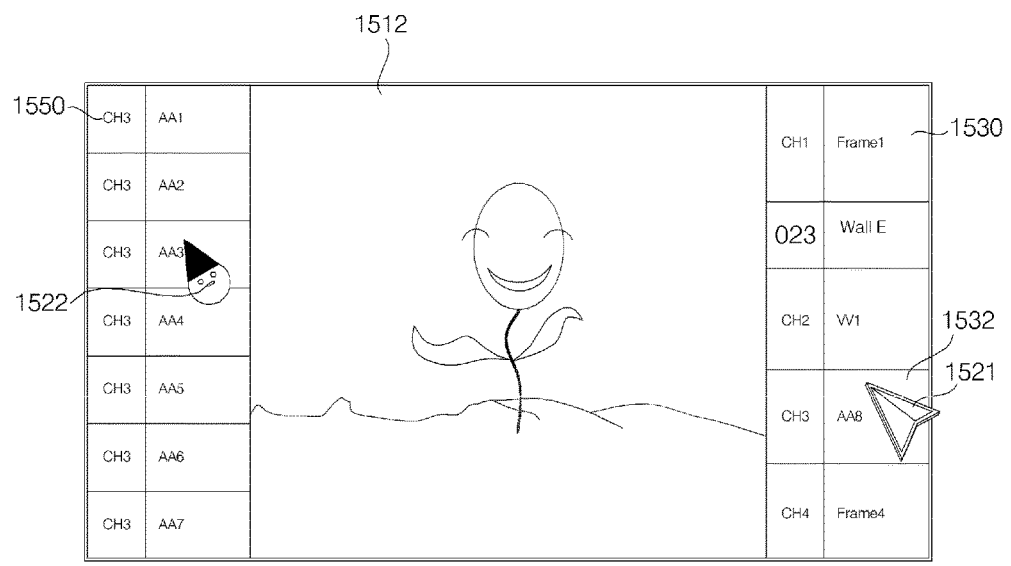

For example, referring to FIG. 22, when the user selects a content item 1532 of the series in the first user screen 1530, a second user screen 1550 may include content items of other editions of the series corresponding to the item 1532.

The image display apparatus 100 according to the embodiment of the present invention may be paired with and linked to two or more remote control devices. Accordingly, a greater number of remote control devices may be additionally linked under operation of the first and second remote control devices.

For example, when the image display apparatus 100 is linked to a third remote control device in a state in which the first and second pointers 1521 and 1522 linked to the first and second remote control devices and the first and second user screens 1530 and 1540 are displayed as exemplarily shown in FIG. 17, a third pointer having a different shape than the first and second pointers 1521 and 1522 may be displayed on the display 180.

Even in this case, a fourth image, which is a magnified version of a main image, i.e. the third image 1512, may be displayed and a third user screen may be displayed on an area of the display 180 where the first and second user screens 1530 and 1540 and the fourth image are not displayed.

Figure 23:
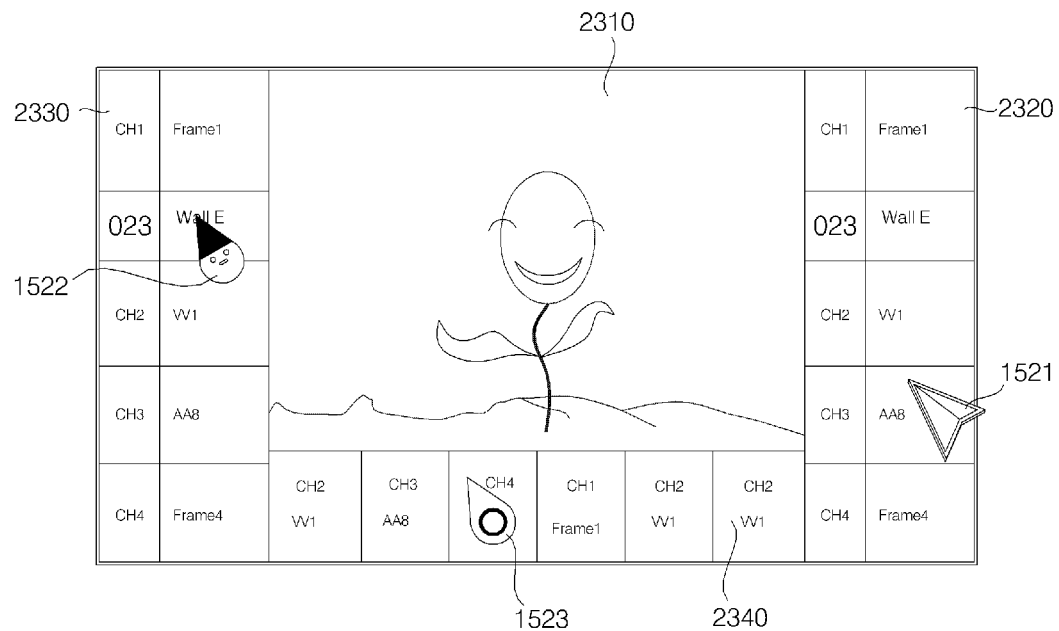
Figure 24:
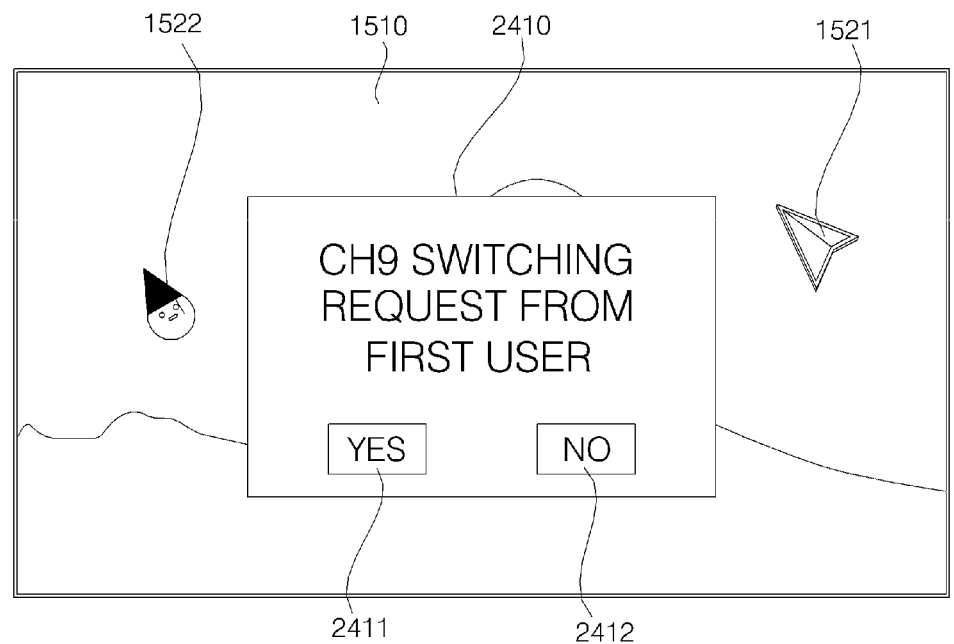

FIG. 23 shows an example in which, through linkage of the third remote control device, a demagnified fourth image 2310, the first to third pointers 1521, 1522 and 1523 linked to the first to third remote control devices and first to third user screens 2330, 2340 and 2350 are displayed.

FIG. 23 is merely given by way of example and the present invention is not limited thereto. For example, the first to third user screens 2330, 2340 and 2350 may be changed in terms of at least one of positional relationship, size and content.

According to an embodiment of the present invention, linkage of one remote control device and linkage of plural remote control devices differ in terms of execution functions and a plurality of pointers and individual areas may be allotted upon linkage of plural remote control devices.

In addition, upon linkage of several remote control devices, control of a common function may be limited and control of individual areas may be restrictively permitted.

That is, as an additional remote control device is linked under linkage of a first remote control device, authority of the user of the first remote control device may be reduced. As a second pointer linked to the first remote control device is displayed, the controller 170 may setting the image display apparatus to limit some of the control authority of the first remote control device with respect to the image display apparatus.

For example, the controller 170 may implement volume change or channel switching only upon receiving a volume change or channel switching command from the first remote control device and also receiving a consent command with regard to the volume change or channel switching from the second remote control device. Upon reception of a channel switching command from the first remote control device in a state in which the first and second pointers 1521 and 1522 are displayed as exemplarily shown in FIG. 15, the controller 170 may display a pop-up window 2410 requesting user consent via the second remote control device on the display 180. The user of the second remote control device may select a YES button 2411 or a NO button 2412 by moving the pointer 1522 using the second remote control device.

According to an embodiment, channel switching may be possible when all of currently connected remote control devices input a consent command. When priority of volume change is given to the user of the first remote control device, volume change may be set to be accomplished via manipulation of the first remote control device, although channel switching requires consent input of another user.

Meanwhile, upon receiving a channel switching command from the first remote control device and a channel switching refusal command from the second remote control device, or upon receiving no channel switching command for a predetermined time, the controller 170 may divide a screen to display an image that has been displayed and an image of a channel corresponding to the channel switching command on the divided areas respectively.

Alternatively, when the first and second remote control devices select different channel banner items from the respective corresponding user screens, channel switching to two channels may be simultaneously implemented such that images of the channels are displayed on different areas.

Figure 25:
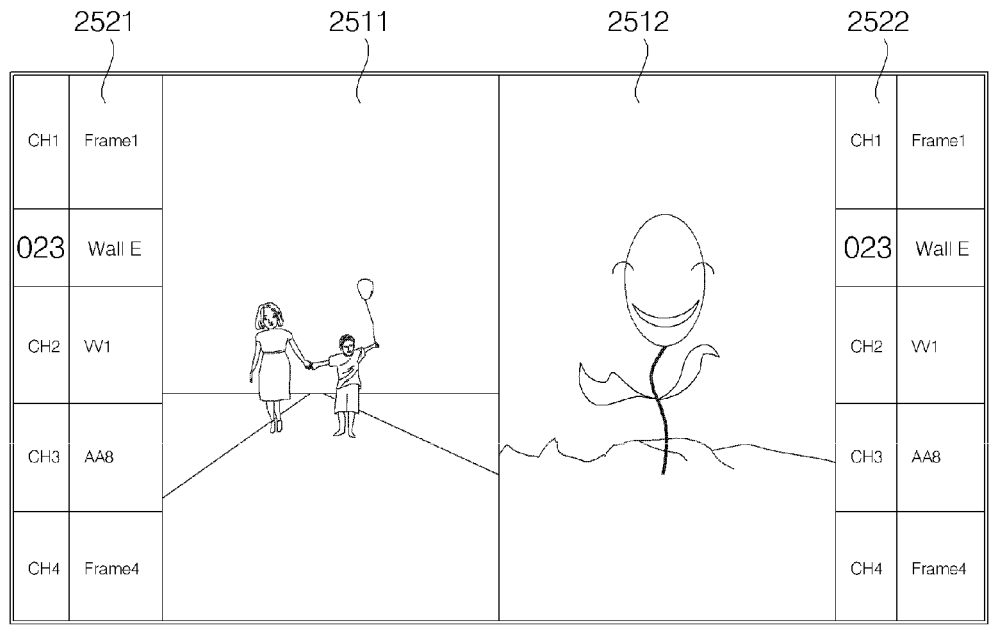

Referring to FIG. 25, a screen may be divided to display an image 2512 and a user screen 2522 corresponding to the first remote control device and an image 2511 and a user screen 2521 corresponding to the second remote control device respectively.

Figure 26:
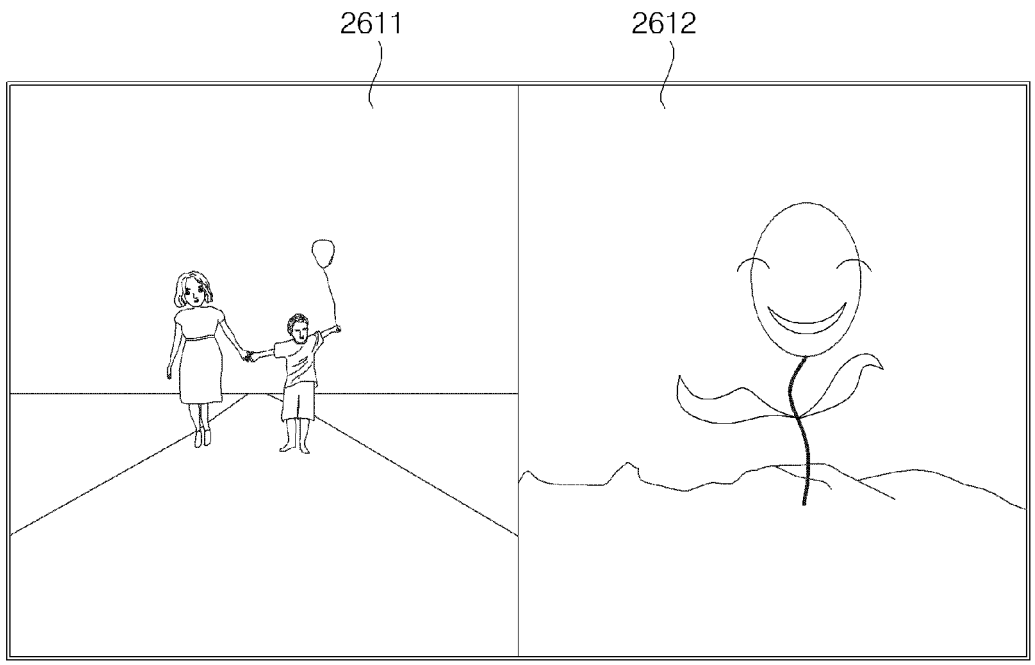

Referring to FIG. 26, a screen may be divided to display an image 2612 corresponding to the first remote control device and an image 2611 corresponding to the second remote control device respectively.

Even in this case, when a third remote control device of a third user is additionally linked to the image display apparatus 100, the screen may be additionally divided.

Figure 27:
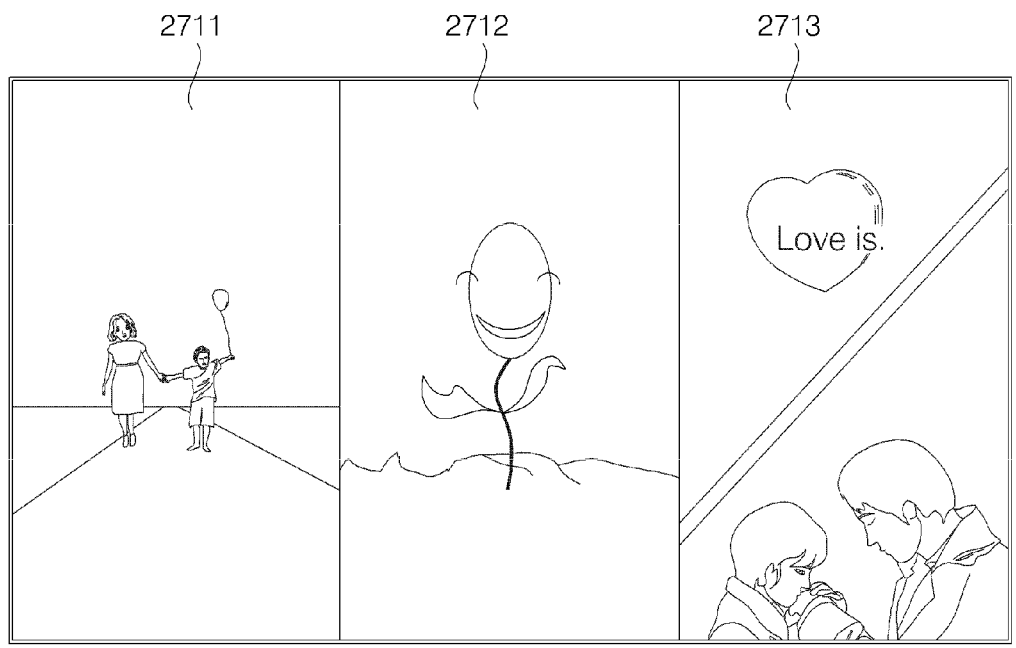

FIG. 27 shows an example in which a screen of the display 180 is divided to display three images 2711, 2712 and 2713. When linkage of the third remote control device ends, the screen may be converted into a bisectional screen having two main images.

Meanwhile, the first user screen may be scrolled based on input to a wheel or touch pad included in the remote control device. In addition, the second and third user screens may be scrolled based on input to a wheel or touch pad of the corresponding remote control device.

According to an embodiment of the present invention, respective objects may be divided into a plurality of areas and the respective areas may correspond to different functions.

When the controller 170 receives input of selecting at least one object among objects included in the first and second user screens and the first image, the controller 170 may determine which area among the plural areas, set to the selected object, is the first pointer or the second pointer located upon reception of the selection input.

The controller 170 may execute the object in a different mode based on the determined area.

Figure 28:
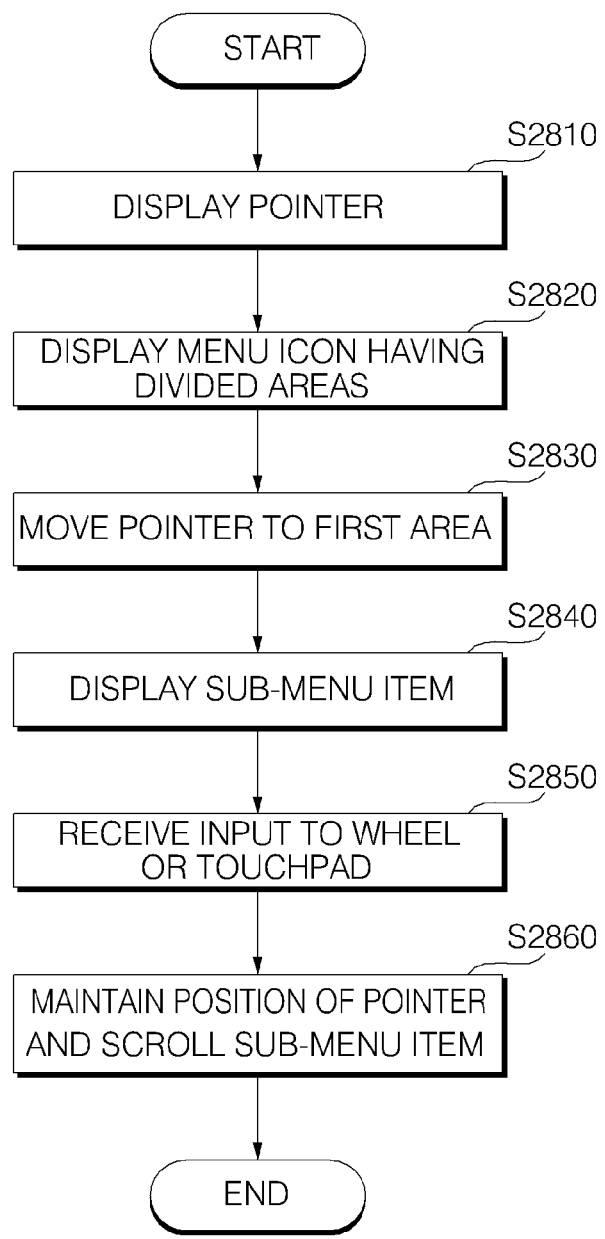
FIG. 28 is a flowchart showing an operating method of an image display apparatus according to one embodiment of the present invention.
Figure 29:
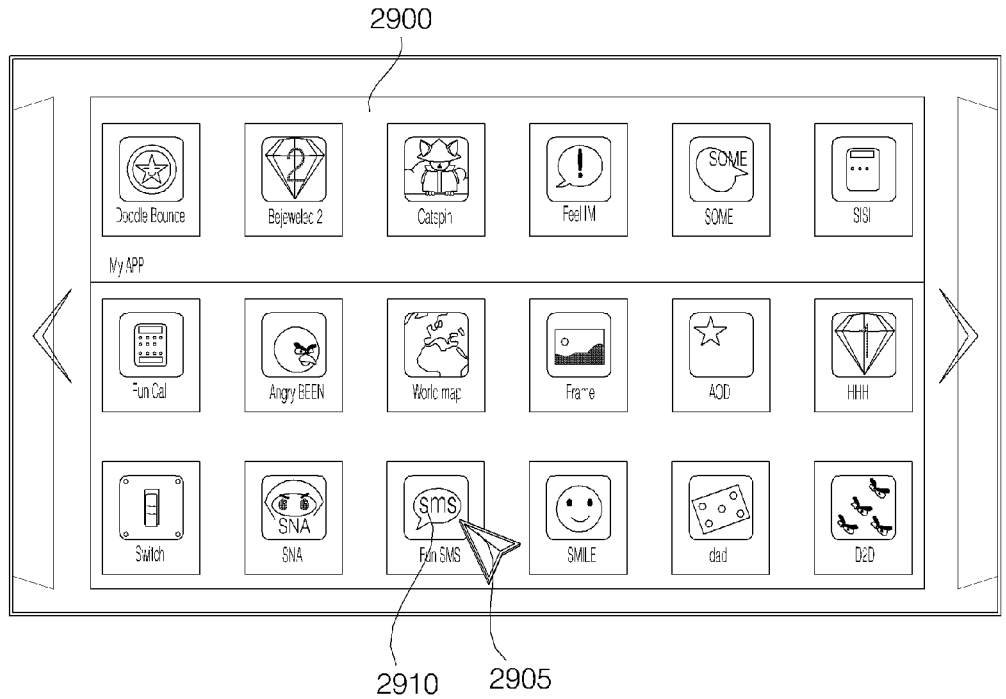
FIGS. 29 to 36 are reference views for explanation of the operating method of the image display apparatus according to the embodiment of the present invention.

FIG. 28 is a flowchart showing an operating method of an image display apparatus according to one embodiment of the present invention, and FIGS. 29 to 36 are reference views for explanation of the operating method of the image display apparatus according to the embodiment of the present invention.

Referring to the drawings, a pointer 2905 which is moved according to motion of the remote control device may be displayed on the display 180 (S2810), and a menu icon 2910 having two or more divided areas may be displayed on the display 180 (S2820).

Here, the menu icon 2910 is a selectable icon and may be an icon, an application icon, a widget or the like that represents various setting menu items of a TV.

Although the pointer 2905 may first be displayed and then a menu may be called by moving the pointer 2905 or in response to input to a key of the remote control device, according to an embodiment, an application screen 2900 including at least one menu icon 2910 may first be displayed and thereafter the pointer 2905 may be displayed according to linkage, wakeup, movement or the like of the remote control device.

Once the user moves the remote control device, the pointer 2905 is moved to a first area among the divided areas of the menu icon 2910 based on motion of the remote control device (S2830).

As the pointer 2905 is moved to the first area, sub-menu items 3010 of the menu icon 2910 may be displayed around the pointer 2905 (S2840).

Figure 30:
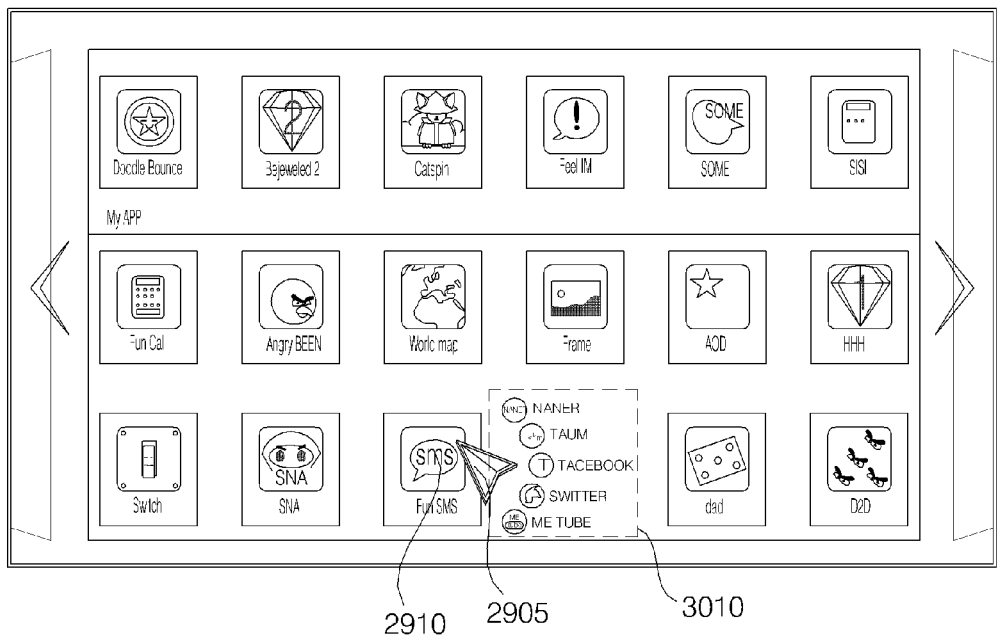

Although FIG. 30 shows an example in which the sub-menu items 3010 are displayed at the right side of the pointer 2905, the present invention is not limited thereto and the display position may be changed.

In addition, the size of the pointer may be changed according to the size of the menu icon and, instead of the pointer, the menu icon may be highlighted when the menu icon has no sub-menu items.

When the pointer 2905 that has been moved to the first area dwells on the first area for a reference time or more, this may be determined as focusing operation and thus the sub-menu items 3010 may be set to be displayed.

As described above with reference to FIG. 10 and other drawings, when the pointer focuses on a specific function or a menu icon, sub-depth (2 depths) menu or function information included in the focused menu or function may be displayed around the pointer. Accordingly, the user may previously know what function the user can select by clicking the information to enter the function and thus rapid execution of the function is possible.

Figure 31:
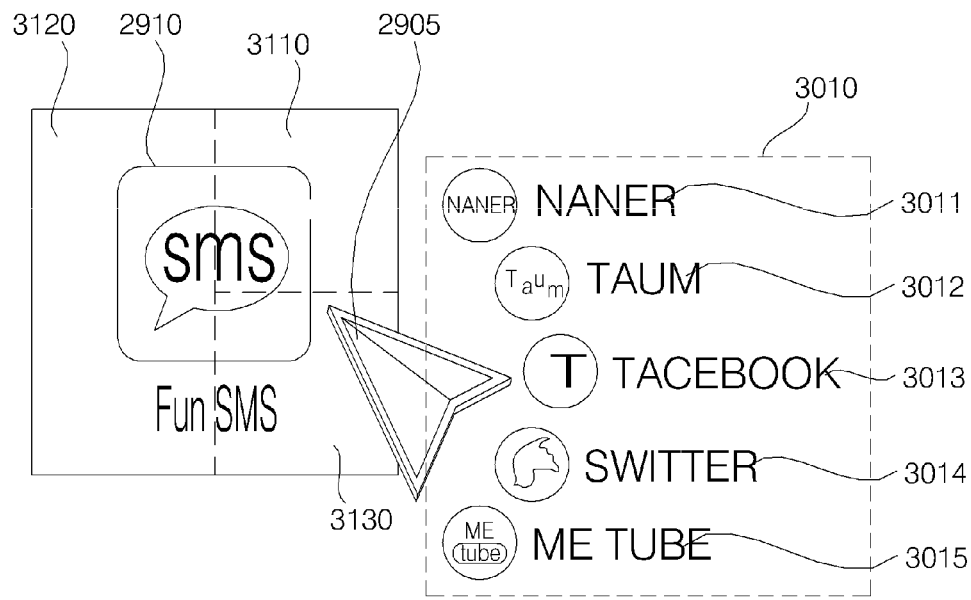

FIG. 31 is a view showing divided areas of the menu icon 2910 having sub-menu items.

Referring to FIG. 31, the menu icon 2910 may be divided into three divided areas 3110, 3120 and 3130.

The divided areas of the menu icon 2910 may include a second area 3110, which is a default execution screen for execution of operation corresponding to the menu icon upon selection of the menu icon 2910, and a third area 3120 which is a latest execution screen for execution of operation corresponding to the menu icon 2910 upon selection of the menu icon 2910.

When the menu icon is an icon having sub-menu items, the menu icon 2910 may include a first area 3130 in which the sub-menu items are displayed according to movement of the pointer.

According to an embodiment of the present invention, it may be possible to directly begin a sub-menu mode or to display sub-menu items to begin the same at a time according to a position of the pointer over the menu icon.

When the pointer is moved to a specific area of the menu icon, sub-menus of a menu may be displayed. Then, when wheel or touch scroll input is additionally received, a sub-menu selection mode may begin and a cursor may be kept stationary.

According to an embodiment, the pointer 2905 may be set to disappear during display of sub-menu items 3011, 3012, 3013, 3014 and 3015. In this case, the sub-menu items 3011, 3012, 3013, 3014 and 3015 may be displayed around the menu icon 2910.

Upon reception of input to a wheel or touch pad of the remote control device (S2850) in a state in which the sub-menu items 3011, 3012, 3013, 3014 and 3015 are displayed (S2840), the pointer may scroll sub-menus while remaining at a displayed position thereof based on the received input (S2860).

Figure 32:
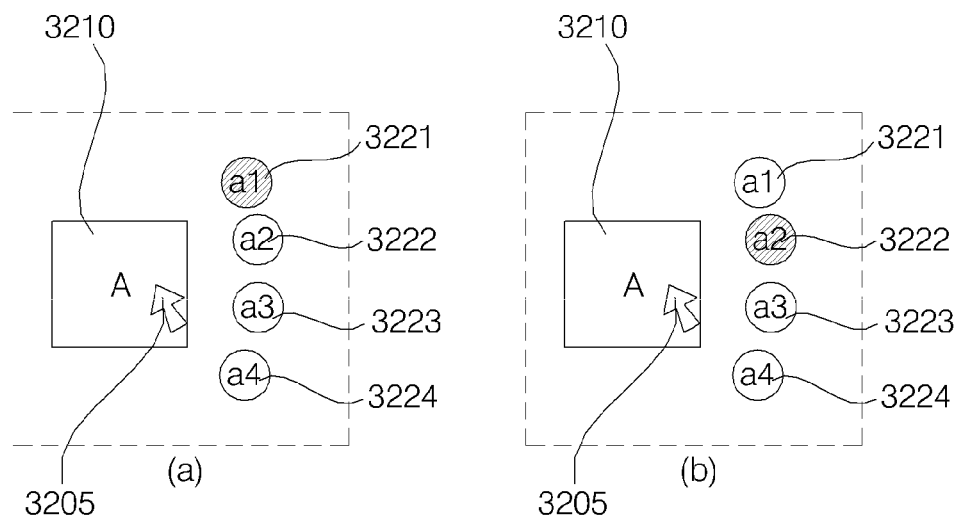

FIG. 32 shows an example in which first to fourth sub-menu items 3221, 3222, 3223 and 3224 of a menu icon 3210 are displayed according to movement of the pointer 3210.

As exemplarily shown in (a) of FIG. 32, the first to fourth sub-menu items 3221, 3222, 3223 and 3224 may be displayed and any one item 3221 may be highlighted by default or a cursor having a prescribed shape may be positioned to represent that selection of any item is possible.

As described above with reference to FIG. 4, the user may select the first sub-menu item 3221 by pushing the okay key 291.

Even if no item is selected after a sub-menu mode begins, the sub-menu mode may be released by long wheel press (of pushing a wheel for a predetermined time or more) or continuous touch for a predetermined time or more, and return to a state prior to display of the sub-menu items is possible.

As exemplarily shown in (b) of FIG. 32, the selected sub-menu item may be changed to the second sub-menu item 3222 when a wheel is scrolled downward.

Figure 33:
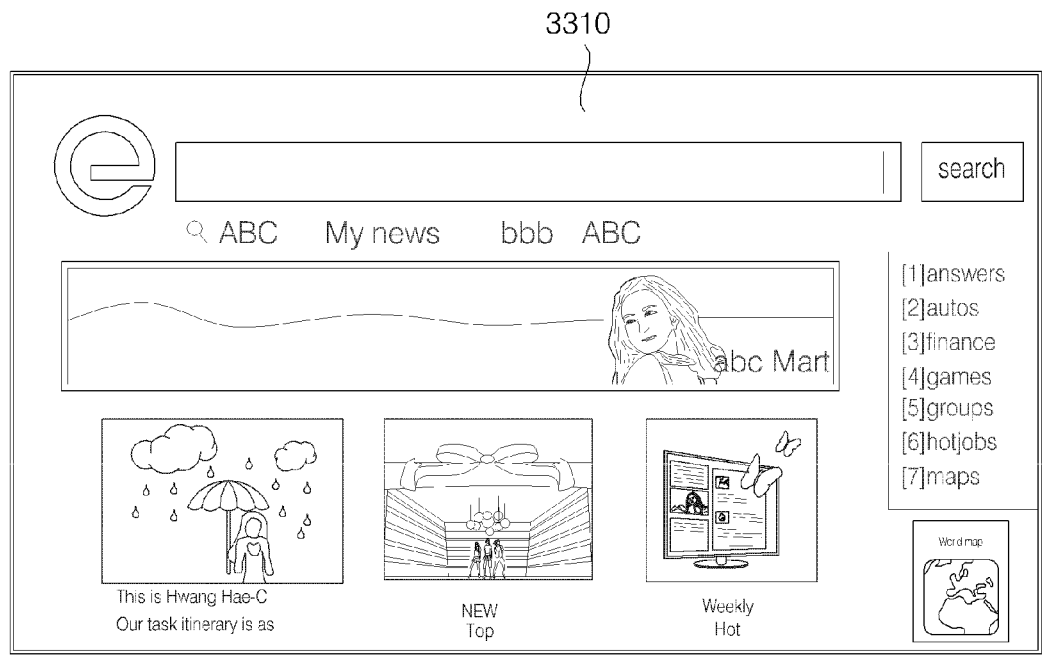

When the user selects the menu icon 2910 in a state in which a pointer 3205 is located over the second area 3110, as exemplarily shown in FIG. 33, a default execution screen 3310 may be displayed for execution of operation corresponding to the menu icon 3210.

Figure 34:
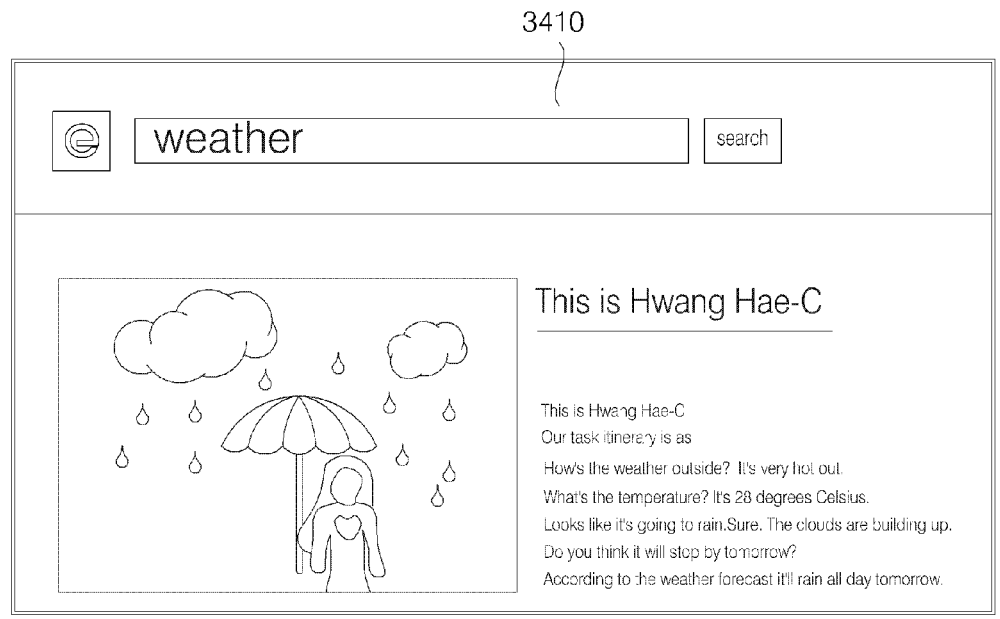

Alternatively, when the user selects the menu icon 2910 in a state in which the pointer 3205 is located over the third area 3120, as exemplarily shown in FIG. 34, a latest execution screen 3410 may be displayed for execution of operation corresponding to the menu icon 2910. Accordingly, the user may directly begin a previous executed menu.

According to an embodiment, when the pointer approaches the menu icon within a predetermined distance, reducing a movement speed of the pointer may contribute to more accurate control by the user using a plurality of divided areas.

Figure 35:
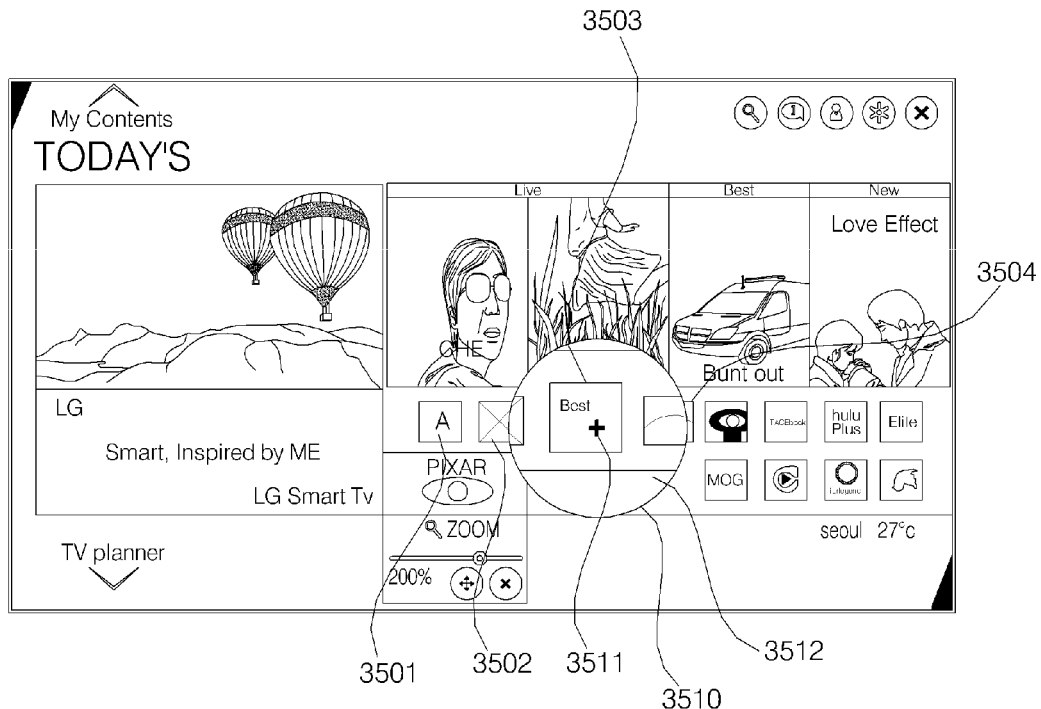

In addition, as exemplarily shown in FIG. 35, when the pointer approaches a menu icon 3503 within a predetermined distance, the pointer may be displayed as a magnifier pointer 3510 that can change magnification and the menu icon 3503 may be displayed in a magnified version. Even in this case, a movement speed of the pointer may be reduced.

The magnifier pointer 3510 may include a cross mark 3511 at the center thereof corresponding to coordinates of a position thereof and a magnifying area 3512, and the user more accurately control the magnifier pointer 3510 on the basis of a position of the cross mark 3511.

The user may move the pointer 3510, more particularly, the cross mark 3511 leftward or rightward to magnify other icons 3501, 3502 and 3504.

When the menu icon is divided into areas of a predetermined number or more, the pointer may be displayed as a magnifier pointer that can change magnification and the menu icon may be displayed in a magnified version.

Figure 36:
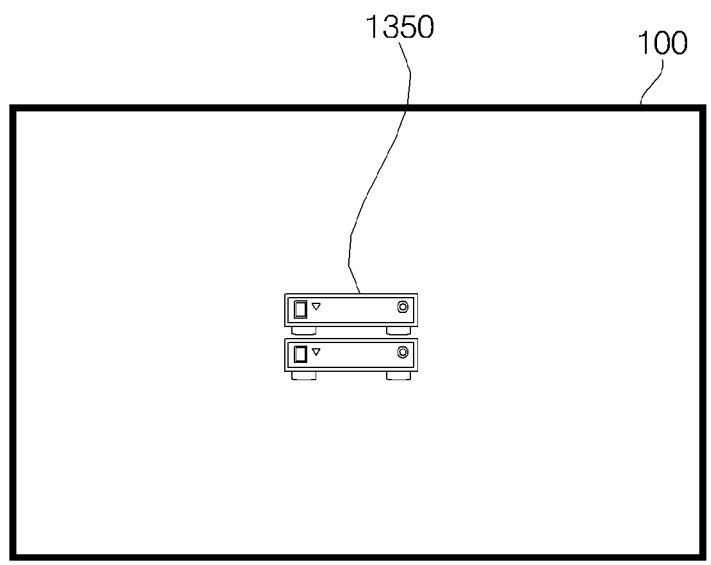

FIG. 36 shows an example in which a menu icon 3610 is divided into nine divided areas, magnifier pointers 3611 and 3612 are used and a magnifying area 3612 displays an area in a magnified version. The user may precisely select or focus on any one of the several divided areas on the basis of a position of a cross mark 3611.

According to the present invention, an icon may include various numbers and formats of divided areas according to the kind of the icon and the presence of sub-menus. Accordingly, it is possible to sort and display only icons having the same divided areas based on a user command.

As is apparent from the above description, according to the present invention, an image display apparatus may be easily controlled using a pointer corresponding to movement of a remote control device. In addition, it is possible to provide a wider variety of functions and to enhance user convenience by displaying pointers and related objects in a visually differentiated manner.

An image display apparatus and an operating method thereof according to the present invention should not be limited to configurations and methods of the embodiments as described above, and some or all of the embodiments may be selectively combined with one another to enable various alterations thereof.

Meanwhile, the operating method of the image display apparatus according to the present invention may be implemented as code that may be written on a processor readable recording medium and thus read by a processor provided in the image display apparatus. The processor readable recording medium may be any type of recording device in which data is stored in a processor readable manner. Examples of the processor readable recording medium may include a ROM, a RAM, a CD-ROM, a magnetic tape, a floppy disc, and an optical data storage device. In addition, the processor readable recording medium includes a carrier wave (e.g., data transmission over the Internet). Also, the processor readable recording medium may be distributed over a plurality of computer systems connected to a network so that processor readable code is written thereto and executed therefrom in a decentralized manner.

Although the preferred embodiments of the present invention have been illustrated and described, those skilled in the art will appreciate that the present invention should not be limited to the above specific embodiments and various modifications thereof are possible without departing from the scope and spirit of the invention as disclosed in the accompanying claims and these modifications should not be understood independently of the technical idea of the present invention.

What is claimed is:

1. An operating method of an image display apparatus, the method comprising:
   displaying a first image on a display;
   displaying a first pointer on the display, the first pointer being linked to a first remote control device;
   displaying a second pointer on the display, the second pointer being linked to a second remote control device, the second pointer having a different shape than the first pointer;
   receiving a first user screen view command from the first remote control device;
   displaying a second image, the second image being a demagnified version of the first image;
   displaying a first user screen on an area of the display where the second image is not displayed;
   receiving, via a user input interface unit, an input to any one item included in the first user screen from the first remote control device or the second remote control device; and
   executing an operation corresponding to the received input,
   wherein the executing includes executing different operations upon reception of the input from the first remote control device or from the second remote control device,
   wherein the executing includes executing an operation corresponding to the item of the received input upon receiving the input from the first remote control device, and
   wherein the executing includes displaying a second user screen on a partial area of the display upon receiving the input from the second remote control device.

2. The operating method according to claim 1, further comprising moving the second pointer to the second user screen and displaying the second pointer in an automated manner.

3. The operating method according to claim 1, wherein the second user screen includes items based on the item of the received input.

4. The operating method according to claim 1, further comprising determining whether or not use of the item of the received input is possible based on user information or device information received from the second remote control device,
   wherein, upon determining that use of the item of the received input is possible, the second user screen is an execution screen of the item of the received input.

5. The operating method according to claim 4, wherein, upon determining that use of the item of the received input is impossible, the second user screen is one of a purchase, installation or certification screen related to the item of the received input.

6. The operating method according to claim 1, further comprising displaying a third image on the display, the third image being a demagnified version of the second image.

7. The operating method according to claim 6, further comprising:
   displaying a third pointer on the display, the third pointer being linked to a third remote control device, the third pointer having a different shape than at least one of the first pointer and the second pointer;
   displaying a fourth image, the fourth image being a demagnified version of the third image; and
   displaying a third user screen on an area of the display where the first and second user screens and the fourth image are not displayed.

8. The operating method according to claim 1, wherein the first user screen includes recommended content items based on user information or device information received from the first remote control device.

9. The operating method according to claim 1, wherein the first user screen includes recommended content items based on the kind of the first image.

10. The operating method according to claim 1, further comprising setting the image display apparatus to limit some of control authority of the first remote control device with respect to the image display apparatus according to display of the second pointer.

11. The operating method according to claim 1, further comprising:
    receiving a volume change or channel switching command from the first remote control device;
    receiving a change or switching consent command from the second remote control device; and
    implementing volume change or channel switching according to the consent command.

12. The operating method according to claim 1, further comprising:
    receiving a channel switching command from the first remote control device; and
    dividing a screen to display an image that has been displayed and an image of a channel corresponding to the channel switching command upon receiving a channel switching refusal command from the second remote control device or upon receiving no channel switching command for a predetermined time.

13. The operating method according to claim 1, wherein the first user screen is scrollable based on an input to a wheel or touch pad included in the remote control device.

14. The operating method according to claim 1, further comprising:

receiving an input of selecting at least one object among objects included in the first and second user screens and the first image;

determining which area among plural areas, set to the selected object, is the first pointer or the second pointer located upon reception of the selection input; and executing the object in a different mode based on the determined area.

\* \* \* \* \*